US012477197B2

(12) United States Patent
Kim et al.

(10) Patent No.: US 12,477,197 B2
(45) Date of Patent: Nov. 18, 2025

(54) IMAGE ACQUISITION APPARATUS FOR ESTIMATING ILLUMINATION INFORMATION BY INPUTTING MULTISPECTRAL IMAGES TO A DEEP LEARNING NETWORK AND ELECTRONIC APPARATUS INCLUDING THE SAME

(71) Applicants: SAMSUNG ELECTRONICS CO., LTD., Suwon-si (KR); EWHA UNIVERSITY—INDUSTRY COLLABORATION FOUNDATION, Seoul (KR)

(72) Inventors: Woo-Shik Kim, Suwon-si (KR); Jewon Kang, Seoul (KR); Jiwon Kim, Seoul (KR); Yungkyung Park, Seoul (KR); Hyejin Oh, Seoul (KR); Byunguk Lee, Seoul (KR)

(73) Assignees: SAMSUNG ELECTRONICS CO., LTD., Suwon-si (KR); EWHA UNIVERSITY—INDUSTRY COLLABORATION FOUNDATION, Seoul (KR)

(*) Notice: Subject to any disclaimer, the term of this patent is extended or adjusted under 35 U.S.C. 154(b) by 386 days.

(21) Appl. No.: 18/091,054

(22) Filed: Dec. 29, 2022

(65) Prior Publication Data

US 2023/0217088 A1 Jul. 6, 2023

(30) Foreign Application Priority Data

Jan. 3, 2022 (KR) ........................ 10-2022-0000512
Apr. 28, 2022 (KR) ........................ 10-2022-0053063

(51) Int. Cl.
*H04N 23/12* (2023.01)
*G06V 10/143* (2022.01)
(Continued)

(52) U.S. Cl.
CPC ........... *H04N 23/12* (2023.01); *G06V 10/143* (2022.01); *G06V 10/758* (2022.01); *H04N 23/125* (2023.01); *H04N 23/843* (2023.01)

(58) Field of Classification Search
CPC ...... G06V 10/143; G06V 10/58; G06V 10/56; G06V 10/60; G06V 20/194; G06V 10/141;
(Continued)

(56) References Cited

U.S. PATENT DOCUMENTS

| | | | | |
|---|---|---|---|---|
| 7,265,753 B1 * | 9/2007 | Zareski | ................. | G06T 15/506 345/426 |
| 11,863,879 B2 * | 1/2024 | Siess | ...................... | H04N 23/74 |

(Continued)

FOREIGN PATENT DOCUMENTS

| | | |
|---|---|---|
| CN | 113676628 A | 11/2021 |
| JP | 6934240 B2 | 9/2021 |

(Continued)

OTHER PUBLICATIONS

Li, Yuqi, Qiang Fu, and Wolfgang Heidrich. "Multispectral illumination estimation using deep unrolling network." Proceedings of the IEEE/CVF international conference on computer vision. 2021. (Year: 2021).*

(Continued)

*Primary Examiner* — Sumati Lefkowitz
*Assistant Examiner* — Connor L Hansen
(74) *Attorney, Agent, or Firm* — Sughrue Mion, PLLC

(57) ABSTRACT

An image acquisition apparatus includes: a multispectral image sensor configured to acquire images in at least four channels based on a second wavelength band of about 10 nm to about 1,000 nm; and a processor configured to estimate illumination information of the images by inputting the images of at least four channels to a deep learning network
(Continued)

trained in advance, and convert colors of the acquired images using the estimated illumination information.

18 Claims, 29 Drawing Sheets

(51) Int. Cl.
*G06V 10/75* (2022.01)
*H04N 23/10* (2023.01)
*H04N 23/84* (2023.01)

(58) Field of Classification Search
CPC ...... G06V 10/758; G06V 10/26; G06V 10/82; G06V 10/774; H04N 9/73; H04N 1/6086; H04N 23/11; H04N 1/6077; H04N 23/84; H04N 23/843; G06T 2207/10036; G06T 7/90; G06T 5/92; G06T 2207/20221; G06T 2207/20081; G06T 2207/20084; G06N 3/08
See application file for complete search history.

(56) References Cited

U.S. PATENT DOCUMENTS

| | | | |
|---|---|---|---|
| 2007/0236715 A1 | 10/2007 | Hashimoto et al. | |
| 2008/0080764 A1 | 4/2008 | Kim et al. | |
| 2012/0155753 A1 | 6/2012 | Masato | |
| 2019/0045161 A1 | 2/2019 | Krestyannikov et al. | |
| 2019/0096049 A1* | 3/2019 | Kim | G06T 5/60 |
| 2021/0160470 A1 | 5/2021 | Afifi et al. | |
| 2022/0014684 A1 | 1/2022 | Zhou et al. | |
| 2022/0103795 A1 | 3/2022 | Lee et al. | |
| 2023/0209029 A1 | 6/2023 | Afifi et al. | |

FOREIGN PATENT DOCUMENTS

| | | | |
|---|---|---|---|
| KR | 10-2007-0099445 A | 10/2007 | |
| KR | 10-2008-0029226 A | 4/2008 | |
| KR | 10-2012-0069539 A | 6/2012 | |
| KR | 10-2019-0080732 A | 7/2019 | |
| KR | 10-2021-0063231 A | 6/2021 | |
| KR | 10-2021-0139450 A | 11/2021 | |
| KR | 10-2021-0144151 A | 11/2021 | |
| KR | 10-2022-0000512 A | 1/2022 | |
| WO | 2021/037934 A1 | 3/2021 | |
| WO | WO-2021091401 A1 * | 5/2021 | G06F 18/24143 |
| WO | 2021/105398 A1 | 6/2021 | |

OTHER PUBLICATIONS

Palaniswamy, Suja. “A robust pose & illumination invariant emotion recognition from facial images using deep learning for human-machine interface.” 2019 4th International conference on computational systems and information technology for sustainable solution (CSITSS). IEEE, 2019. (Year: 2019).*

Communication issued May 25, 2023 by the European Patent Office in European Patent Application No. 22217364.3.

Li, Yuqi et al., “Multispectral illumination estimation using deep unrolling network”, 2021 IEEE/CVF International Conference on Computer Vision (ICCV), IEEE, Oct. 10, 2021, pp. 2652-2661, XP034093889.

Robles-Kelly, Antonio et al., “A Convolutional Neural Network for Pixelwise Illuminant Recovery in Colour and Spectral Images”, 2018 24th International Conference on Pattern Recognition (ICPR), Beijing, China, Aug. 20-24, 2018, pp. 109-114, XP093047133.

Arjan Gijsenij et al., “Computational Color Constancy: Survey and Experiments”, IEEE Transactions on Image Processing, vol. 20, No. 9, Sep. 2011, pp. 2475-2489, DOI: 10.1109/TIP.2011.2118224.

Yinqiang Zheng et al., “Illumination and Reflectance Spectra Separation of a Hyperspectral Image Meets Low-Rank Matrix Factorization”, Proceedings of the IEEE Conference on Computer Vision and Pattern Recognition (CVPR), 2015, pp. 1779-1787.

Simone Bianco et al., “Color Constancy Using CNNs”, Apr. 17, 2015, 9 pages, arXiv:1504.04548v1 [cs.CV].

Laurence T. Maloney et al., “Color constancy: a method for recovering surface spectral reflectance”, Journal of the Optical Society of America A, vol. 3, No. 1, Jan. 1986, pp. 29-33, DOI: 10.1364/JOSAA.3.000029.

Kobus Barnard et al., “A Comparison of Computational Color Constancy Algorithms-Part I: Methodology and Experiments With Synthesized Data”, IEEE Transactions on Image Processing, vol. 11, No. 9, Sep. 2002, pp. 972-983, DOI: 10.1109/TIP.2002.802531.

Mahmoud Afifi et al., “What Else Can Fool Deep Learning? Addressing Color Constancy Errors on Deep Neural Network Performance”, Proceedings of the IEEE/CVF International Conference on Computer Vision (ICCV), 2019, 10 pages, arXiv:1912.06960v1 [cs.CV].

Mahmoud Afifi et al., “Sensor-Independent Illumination Estimation for DNN Models”, Proceedings of the British Machine Vision Conference (BMVC), 2019, 13 pages, arXiv:1912.06888v1 [cs.CV].

Jiwon Kim et al., “Deep learning-based lighting estimation algorithm and data generation using hyperspectral images”, Proceedings of the 34th Workshop on Image Processing and Image Understanding (IPIU), 2022, 6 pages.

Communication issued on Nov. 28, 2023 by the Korean Intellectual Property Office in Korean Patent Application No. 10-2022-0053063.

Stamatios Georgoulis et al., “Reflectance and Natural Illumination from Single-Material Specular Objects Using Deep Learning”, IEEE Transactions on Pattern Analysis and Machine Intelligence, Aug. 22, 2017, 14 pages.

* cited by examiner

FIG. 3A

| 10 | 12 | 14 | 16 | 10 | 12 | 14 | 16 | | |
|---|---|---|---|---|---|---|---|---|---|
| 9 | 11 | 13 | 15 | 9 | 11 | 13 | 15 | | |
| 2 | 4 | 6 | 8 | 2 | 4 | 6 | 8 | | |
| 1 | 3 | 5 | 7 | 1 | 3 | 5 | 7 | | |
| 10 | 12 | 14 | 16 | 10 | 12 | 14 | 16 | · | · |
| 9 | 11 | 13 | 15 | 9 | 11 | 13 | 15 | | |
| 2 | 4 | 6 | 8 | 2 | 4 | 6 | 8 | | |
| 1 | 3 | 5 | 7 | 1 | 3 | 5 | 7 | | |
| | | | | · | | | | | |
| | | | | · | | | | | |

400
Multispectral image
I (image patch)
(32×32×31)
410
Convolution / ReLU / Max pooling layers
32
32
16
32
32
32
16
16
32
16
16
64
4
4
64
Fully connected layer
420
1024
64
31
430
L estimation
(31×1 vector)

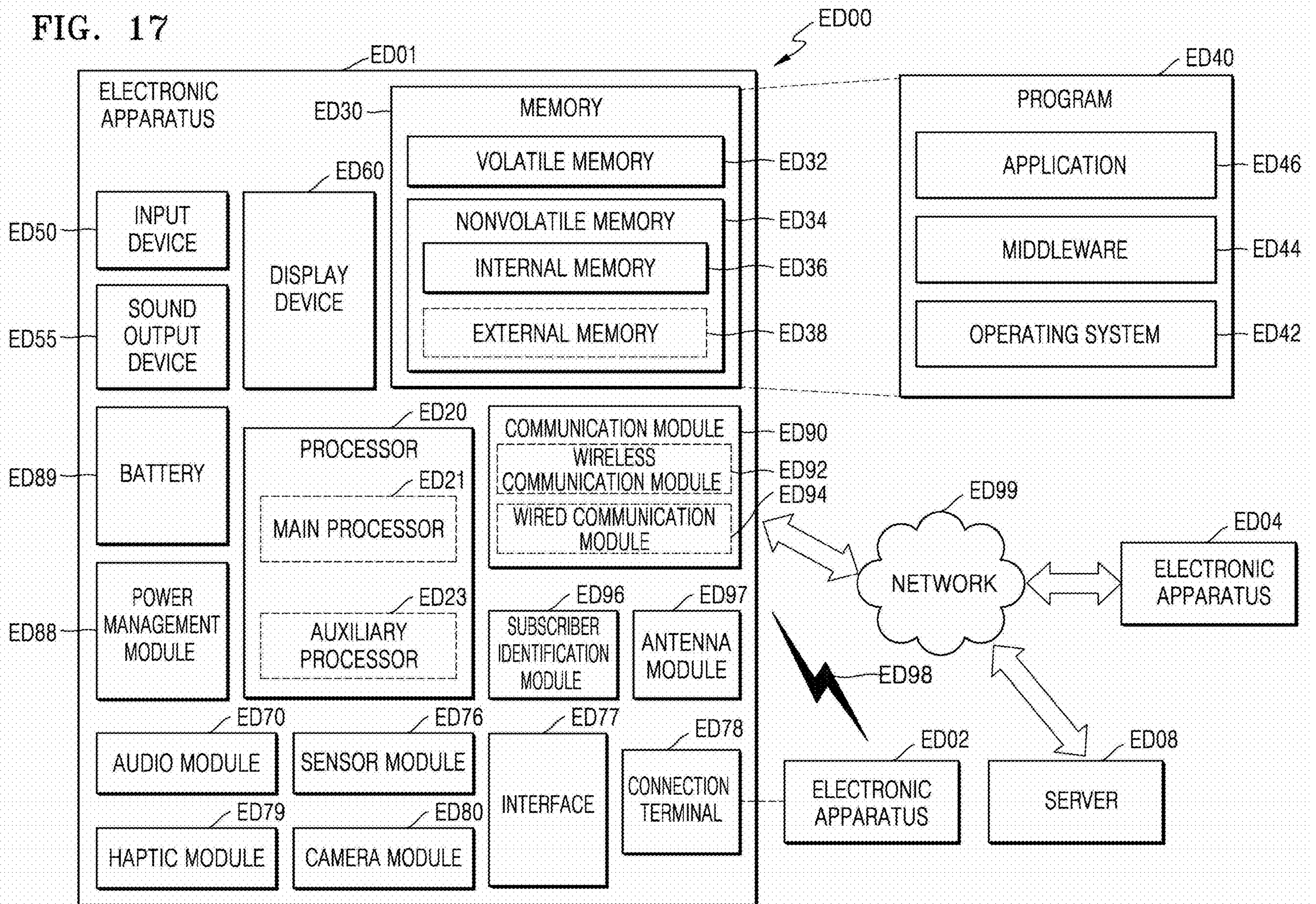
FIG. 17
ED00
ELECTRONIC APPARATUS
ED01
INPUT DEVICE
ED50
SOUND OUTPUT DEVICE
ED55
BATTERY
ED89
POWER MANAGEMENT MODULE
ED88
DISPLAY DEVICE
ED60
MEMORY
ED30
VOLATILE MEMORY
ED32
NONVOLATILE MEMORY
ED34
INTERNAL MEMORY
ED36
EXTERNAL MEMORY
ED38
PROCESSOR
ED20
MAIN PROCESSOR
ED21
AUXILIARY PROCESSOR
ED23
COMMUNICATION MODULE
ED90
WIRELESS COMMUNICATION MODULE
ED92
WIRED COMMUNICATION MODULE
ED94
SUBSCRIBER IDENTIFICATION MODULE
ED96
ANTENNA MODULE
ED97
INTERFACE
ED77
CONNECTION TERMINAL
ED78
SENSOR MODULE
ED76
CAMERA MODULE
ED80
AUDIO MODULE
ED70
HAPTIC MODULE
ED79
PROGRAM
ED40
APPLICATION
ED46
MIDDLEWARE
ED44
OPERATING SYSTEM
ED42
NETWORK
ED99
ED98
ELECTRONIC APPARATUS
ED04
SERVER
ED08
ELECTRONIC APPARATUS
ED02

IMAGE ACQUISITION APPARATUS FOR ESTIMATING ILLUMINATION INFORMATION BY INPUTTING MULTISPECTRAL IMAGES TO A DEEP LEARNING NETWORK AND ELECTRONIC APPARATUS INCLUDING THE SAME

CROSS-REFERENCE TO RELATED APPLICATIONS

This application is based on and claims priority under 35 U.S.C. § 119 to Korean Patent Application No. 10-2022-0000512, filed on Jan. 3, 2022, in the Korean Intellectual Property Office, and Korean Patent Application No. 10-2022-0053063, filed on Apr. 28, 2022, in the Korean Intellectual Property Office, the disclosures of which are incorporated by reference herein in their entireties.

BACKGROUND

1. Field

The present disclosure relates to image acquisition apparatuses and electronic apparatuses including the image acquisition apparatuses.

2. Description of the Related Art

Image sensors receive light incident from an object and photoelectrically convert the received light into an electrical signal.

Such an image sensor uses a color filter including an array of filter elements capable of selectively transmitting red light, green light, and blue light for color expression, senses the amount of light that passed through each filter element, and then forms a color image of an object through image processing.

Because the values sensed by image sensors are affected by illumination, the colors of images captured by cameras are also affected by illumination. A technique for eliminating such effects and photographing the unique colors of objects as close as possible is referred to as "white balance" (WB).

In the related art, an RGB image is first captured, and then WB is performed by analyzing information contained in the RGB image. However, because this method is based on the Gray World Assumption, that is, the assumption that the averages of R, G, and B channel values are equal to each other, or has other limiting conditions, the method may not work properly when the assumption or the limiting conditions are not satisfied.

SUMMARY

Provided are image acquisition apparatuses and electronic apparatuses including the image acquisition apparatuses.

Additional aspects will be set forth in part in the description which follows and, in part, will be apparent from the description, or may be learned by practice of the presented embodiments of the disclosure.

According to an aspect of an example embodiment, an image acquisition apparatus includes: a multispectral image sensor configured to acquire images in at least four channels based on a second wavelength band of about 10 nm to about 1,000 nm; and a processor configured to estimate illumination information of the images by inputting the images of at least four channels to a deep learning network trained in advance, and convert colors of the acquired images using the estimated illumination information.

According to an aspect of an example embodiment, an electronic apparatus includes the image acquisition apparatus.

According to an aspect of an example embodiment, a method of controlling an image acquisition apparatus includes: acquiring images in at least four channels based on a second wavelength band of about 10 nm to about 1,000 nm; estimating illumination information of the images by inputting the images of at least four channels to a deep learning network trained in advance; and converting colors of the acquired images by using the estimated illumination information.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A and 3B are views illustrating example images acquired by a multispectral image sensor according to example embodiments.

FIG. 17 is a block diagram illustrating a schematic structure of an electronic apparatus according to an example embodiment;

DETAILED DESCRIPTION

Figure 1A:
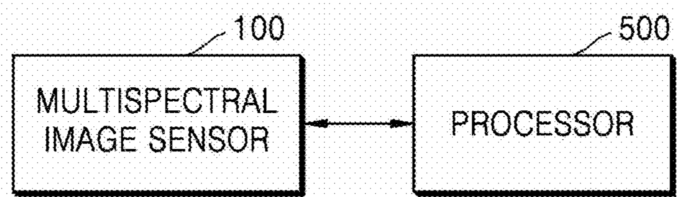
FIGS. 1A and 1B are block diagrams illustrating schematic structures of image acquisition apparatuses according to example embodiments.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described with reference to the accompanying drawings. The embodiments described below are only examples, and thus, it should be understood that the embodiments may be modified in various forms. In the drawings, like reference numerals refer to like elements throughout, and the sizes of elements may be exaggerated for clarity.

In the following description, when an element is referred to as being "above" or "on" another element, it may be directly on the other element while making contact with the other element or may be above the other element without making contact with the other element.

Although terms such as "first" and "second" are used to describe various elements, these terms are only used to distinguish one element from another element. These terms do not limit elements to having different materials or structures.

As used herein, the singular forms "a," "an," and "the" are intended to include the plural forms as well, unless the context clearly indicates otherwise. In addition, it will be understood that when a unit is referred to as "comprising" another element, it does not preclude the possibility that one or more other elements may exist or may be added.

In the present disclosure, terms such as "unit" or "module" may be used to denote a unit that has at least one function or operation and is implemented with hardware, software, or a combination of hardware and software.

An element referred to with the definite article or a demonstrative pronoun may be construed as the element or the elements even though it has a singular form.

Operations of a method may be performed in an appropriate order unless explicitly described in terms of order or described to the contrary. In addition, examples or exemplary terms (for example, "such as" and "etc.") are used for the purpose of description and are not intended to limit the scope of the present disclosure unless defined by the claims.

In general, a value sensed by a camera may be expressed by the product of illumination, the color of an object, and the response of the camera according to Equation 1 below.

$$\rho=\int E(\lambda)S(\lambda)R(\lambda)d\lambda \quad \text{[Equation 1]}$$

where ρ indicates a sensed value, and E(λ), S(λ), R(λ) and respectively indicate the illumination, the surface reflectance of an object, and the response of a camera as functions of spectrum λ. Because a value sensed by a camera is affected by illumination, the color of an image captured by the camera is also affected by illumination. White balance (WB) refers to a technique or process for eliminating an effect of illumination and capturing the unique color of an object as close as possible.

Automated white balance (AWB) may be applied to pre-processing of camera images to render the unique colors of objects in the images, and thus, AWB may be useful from a photographic point of view and may be applied to image processing and computer vision research such as object recognition, scene understanding, and color augmentation. A recent study showed that incorrect WB settings act as an adversarial attack model with respect to deep neural networks, and thus, effective AWB is considered important for the stable recognition performance of post-processing processes and applications that use deep learning. AWB may also be applied to aesthetic image processing and adjustment of colors such as human skin colors, which are easily recognized by humans and have a significant effect on overall image preference.

The basic principle of AWB for digital images is to estimate illumination components and then remove the effect of illumination through a linear transformation using a 3×3 illumination correction matrix in an RGB color space of a camera. However, it is difficult to decompose reflectance and illumination components in a three-dimensional RGB space because of overlapping wavelength information in an RGB sensor. Therefore, when illumination correction is performed using a diagonal matrix, color correction is not properly performed on colors other than achromatic colors.

An image acquisition apparatus according to an embodiment uses multispectral images to reduce overlapping between wavelengths and may thus express illumination components as a diagonal matrix. Thus, calculations for AWB may be reduced, and the unique colors of objects may be more accurately expressed. In particular, an embodiment provides a method of constructing and training, through deep learning, a low-dimensional determinant-based basis space model, which cannot be effectively constructed by a model-based illumination compensation method of the related art.

FIG. 1A is a block diagram illustrating a schematic structure of an image acquisition apparatus according to an embodiment.

Referring to FIG. 1A, the image acquisition apparatus includes a multispectral image sensor 100 and a processor 500.

The multispectral image sensor 100 acquires images in at least four channels based on a wavelength band of about 10 nm to about 1,000 nm. In addition, the multispectral image sensor 100 may generate images in 16 channels within a wavelength range of about 10 nm to about 1,000 nm, or may generate images in 31 channels through interpolation using images of 16 channels. However, the number of channels in which the multispectral image sensor 100 may acquire or generate images is not limited to 4, 16, or 31.

The processor 500 may estimate illumination information by inputting images of at least four channels obtained by the multispectral image sensor 100 to a pre-trained deep learning network, and may perform a color conversion on the images by using the estimated illumination information. Input images to the deep learning network, training and outputs of the deep learning network, and image restoration will be described later.

Figure 1B:
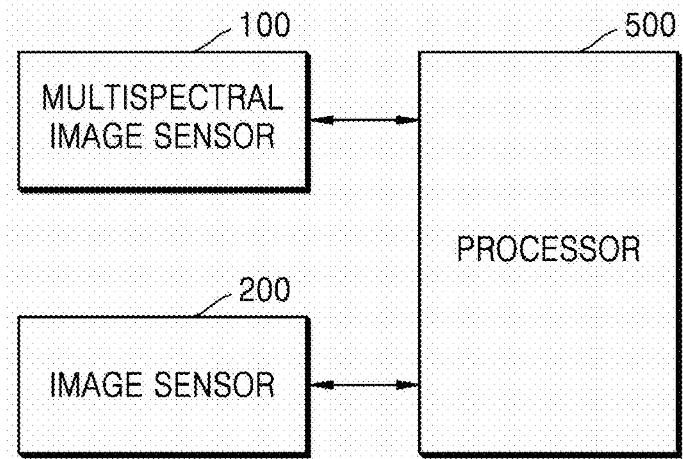

FIG. 1B is a block diagram illustrating a schematic structure of an image acquisition apparatus according to an embodiment.

Referring to FIG. 1B, the image acquisition apparatus includes a multispectral image sensor 100, an image sensor 200, and a processor 500. The image acquisition apparatus of the embodiment performs WB on images captured by a plurality of image sensors. The image sensor 200 acquires a first image IM1 in a first wavelength band. A second wavelength band may include the first wavelength band and may be wider than the first wavelength band. The multispectral image sensor 100 acquires a second image IM2 in the second wavelength band. The image sensor 200 may include an RGB image sensor, and the multispectral image sensor 100 may include a multispectral image (MSI) sensor. The RGB image sensor has an R channel, a G channel, and a B channel. The MSI sensor has more channels than the RGB image sensor and thus senses light in more wavelength bands than the RGB image sensor. In an embodiment, the multispectral image sensor 100 may acquire images in four or more channels based on the second wavelength band ranging from about 10 nm to about 1,000 nm. In addition, the multispectral image sensor 100 may generate images in 16 channels within a wavelength range of about 10 nm to about 1,000 nm, or may generate images in 31 channels by interpolation using images of 16 channels.

The image sensor 200 may be a sensor for a general RGB camera, such as a CMOS image sensor using a Bayer color filter array. The first image IM1 acquired by the image sensor 200 may be an RGB image based on red, green, and blue.

The multispectral image sensor 100 may be a sensor capable of sensing light at more wavelengths than the image sensor 200. The multispectral image sensor 100 may use, for example, 16 channels, 31 channels, or another number of channels. The bandwidth of each channel of the multispectral image sensor 100 may be set to be narrower than R, G, and B bandwidths, and the total band which is the sum of the bands of all the channels may include and may be wider than RGB bands, that is, a visible light band. For example, the total band of the multispectral image sensor 100 may range from about 10 nm to about 1,000 nm. The second image IM2 acquired using the multispectral image sensor 100 may be a multispectral or hyperspectral image, and may be an image based on wavelengths in 16 or more channels into which a wavelength band wider than the RGB wavelength bands is divided, for example, a wavelength band including the visible wavelength band and ranging from an ultraviolet wavelength band to an infrared wavelength band is divided. The second image IM2 may be acquired using all available channels of the multispectral image sensor 100 or may be acquired using selected channels of the multispectral image sensor 100. The spatial resolution of the second image IM2 may be lower than that of the first image IM1, but is not limited thereto.

In an embodiment, the image sensor 200 may include an RGB image sensor. In this case, the RGB image sensor may be a CMOS image sensor. The RGB image sensor may use a Bayer color filter array to generate a three-channel image by sensing spectra respectively representing R, G, and B. However, the RGB senor may use another type of a color filter array. The MSI sensor may sense and express light of wavelengths different from wavelengths that the RGB image sensor senses and expresses. The MSI sensor has more channels than the RGB image sensor and thus senses more wavelengths. For example, the MSI sensor may have 16 channels. In another example, the MSI sensor may have 31 channels. The transmission band, transmission amount, and transmission bandwidth of each of the channels may be adjusted for sensing light in a desired band. The total bandwidth which is the sum of the bandwidths of all the channels may include and may be wider than the bandwidth of a general RGB image sensor. The sensing spectra or wavelength bands of the RGB image sensor and the MSI sensor will be described later with reference to FIGS. 8 and 12.

The processor 500 estimates illumination information by inputting images of four or more channels obtained using the multispectral image sensor 100 to a pre-trained deep learning network. The processor 500 performs color conversion on images by using the illumination information output through the deep learning network. Here, the illumination information may include an illumination vector corresponding to the spectral intensity of illumination, an XYZ vector indicating the color of illumination, an RGB vector indicating the color of illumination, the color temperature of illumination, or an index value indicating pre-stored illumination information.

In addition, the processor 500 may input images of 16 channels or images of 31 channels obtained from the multispectral image sensor 100 to the deep learning network.

Figure 3B:
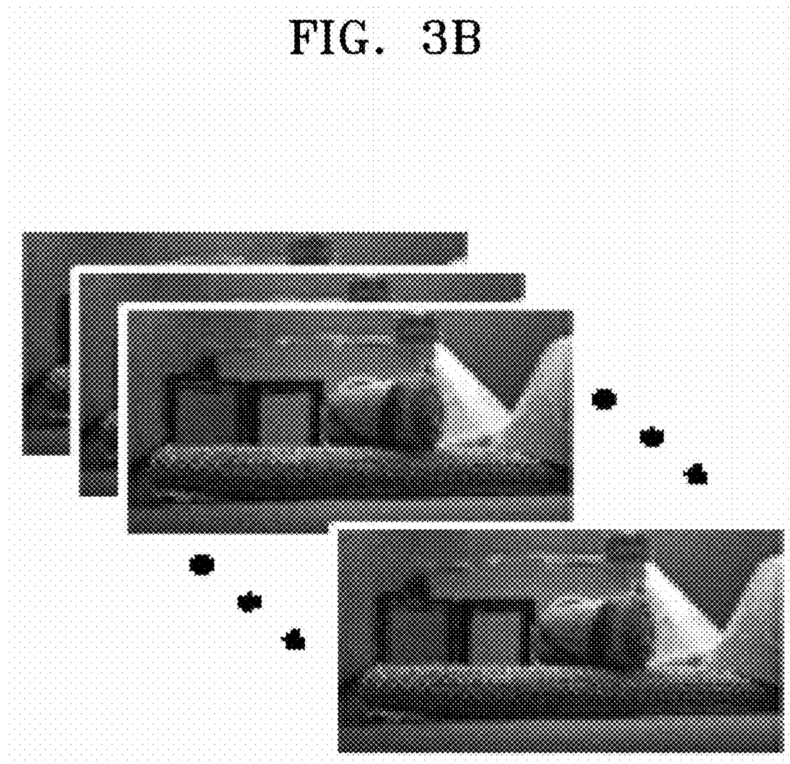

FIGS. 3A and 3B respectively represent a raw image acquired with a multispectral image sensor and images obtained by demosaicing. In the raw image shown in FIG. 3A, each small square denotes a pixel. Numbers in squares indicate channel numbers. As shown in FIG. 3A, pixels corresponding to different channels, for example, 16 channels are mixed with each other in the raw image. As shown in FIG. 3B, pixels of the same channel are gathered through demosaicing to generate an image of each channel. The processor 500 may input images generated as shown in FIGS. 3A and 3B to the deep learning network to estimate illumination information.

The processor 500 may perform color conversion, AWB, and/or color correction using estimated illumination. In this case, the processor 500 may perform AWB and/or color correction on an image obtained using the image sensor 200. The image sensor 200 and the multispectral image sensor 100 may take images of the same scene, and the image taken with the image sensor 200 may be corrected using illumination information estimated using the multispectral image sensor 100. In addition, as shown in FIG. 1A, an image captured with the multispectral image sensor 100 may be corrected. For example, among images captured with the multispectral image sensor 100, images corresponding to an R channel, a G channel, and a B channel may be set as original images; illumination information may be estimated using images of four or more channels, for example, 16 or 31 channels; and the estimated illumination information may be reflected in the original images.

Figure 2:
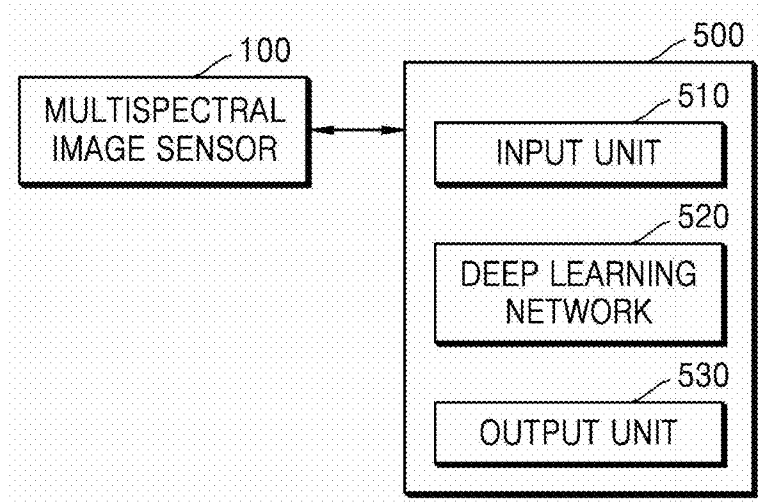
FIG. 2 is a detailed block diagram illustrating the image acquisition apparatus shown in FIG. 1A.

FIG. 2 is a detailed block diagram illustrating the image acquisition apparatus shown in FIG. 1A. Referring to FIG. 2, for a function of estimating illumination information, the image acquisition apparatus includes the multispectral image sensor 100 and an illumination information estimation device 500. Here, the processor 500 shown in FIG. 1A and the illumination information estimation device 500 will be described as performing the same function. The illumination information estimation device 500 may be a functional module of the processors 500 illustrated in FIGS. 1A and 1B. Descriptions of the same parts as those illustrated in FIGS. 1A and 1B will be omitted, and the illumination information estimation device 500 will be mainly described.

The illumination information estimation device 500 includes an input unit 510, a deep learning network 520, and an output unit 530. The illumination information estimation device 500 may receive images of four or more channels in a wavelength range of about 10 nm to about 1,000 nm from the multispectral image sensor 100 and may output an illumination spectrum for each channel.

The input unit 510 inputs the images of four or more channels to the deep learning network 520. Here, the input to the deep learning network 520 may include one or a combination of the following. The input to the deep learning network 520 may be multi-channel images acquired from the multispectral image sensor 100. For example, when images are acquired in 16 channels, images of all the 16 channels or some of the 16 channels may be input to the deep learning network 520. Alternatively, images of more than 16 channels may be input to the deep learning network 520 by obtaining information on channels more than 16 channels through interpolation using the 16 channels. For example, images of 31 channels may be interpolated from images of 16 channels obtained from the multispectral image sensor 100, and may be input to the deep learning network 520.

The input unit 510 may sample channel images at intervals of given wavelength bands and may input the sampled channel images to the deep learning network 520. Here, the intervals may be regular or uniform. In addition, the input unit 510 may input normalized channel images to the deep learning network 520.

A portion or all of a captured image may be used as an input image. In addition, a scaled image may be used as an input image. Alternatively, both the scaled image and the unscaled image may be used as input images. In addition, images converted by other methods may be used as input images.

The deep learning network 520 estimates illumination information from input images. The deep learning network 520 may include a convolution layer, a rectified linear unit (ReLU) layer that is an activation function layer, a max pooling layer, and a fully-connected layer. The deep learning network 520 may be trained by comparing angular errors or the like between illumination information estimated for each input image and ground-truth illumination. The deep learning network 520 will be described later with reference to FIG. 4.

The output unit 530 may output illumination information estimated by the deep learning network 520 as a vector having the intensity value of the illumination spectrum of each channel. For example, the output unit 530 may output a 31-dimensional vector. In this case, intensity values respectively corresponding to 31 channels may be recorded as the components of the vector. The output of the deep learning network 520 may be an index value indicating already stored illumination information. The output of the deep learning network 520 may be an illumination vector. In this case, the illumination vector may be a multidimensional vector. For example, a 16-dimensional vector may be output fora 16-channel multispectral image sensor. Alternatively, a three-dimensional vector indicating XYZ values in an XYZ color coordinate system may be output. Alternatively, a three-dimensional vector indicating RGB values in an RGB color coordinate system may be output. Alternatively, a color temperature value or an index value, which indicates the color temperature of illumination, may be output.

In an embodiment, the output unit 530 may output an image instead of the aforementioned outputs. In this case, each position (x, y) of the image may record illumination information at each pixel position.

In an embodiment, the illumination information estimation device 500 or the processor 500 may output an image, which is corrected using a deep learning network or a generative neural network to reflect illumination information. In this case, an image acquired with the multispectral image sensor 100 may be corrected. Alternatively, an image acquired with the image sensor 200 may be corrected. When the output of the deep learning network is an illumination spectrum, AWB may be performed by calculating, using the illumination spectrum, an illumination vector in a color space of an image to be corrected, and dividing each color pixel value of the image by the components of the illumination vector. For example, AWB may be performed on an RGB image by calculating an RGB vector [r, g, b] from the spectrum of illumination, and correcting each pixel value [Ri, Gi, Bi] of the RGB image as expressed by [Ri/r, Gi/g, Bi/b]. Alternatively, the RGB image may be corrected using a conversion equation considering a cross-channel conversion as expressed by [Ri', Gi', Bi']'=M [Ri, Gi, Bi]', where M is a 3×3 conversion matrix. In addition, a normalized input may be restored by multiplying the normalized input by a scale value. When the wavelength band of a channel of an input signal is different from the wavelength band of a channel of an output signal, restoration may be performed through interpolation from the channel of the output signal.

Figure 4:
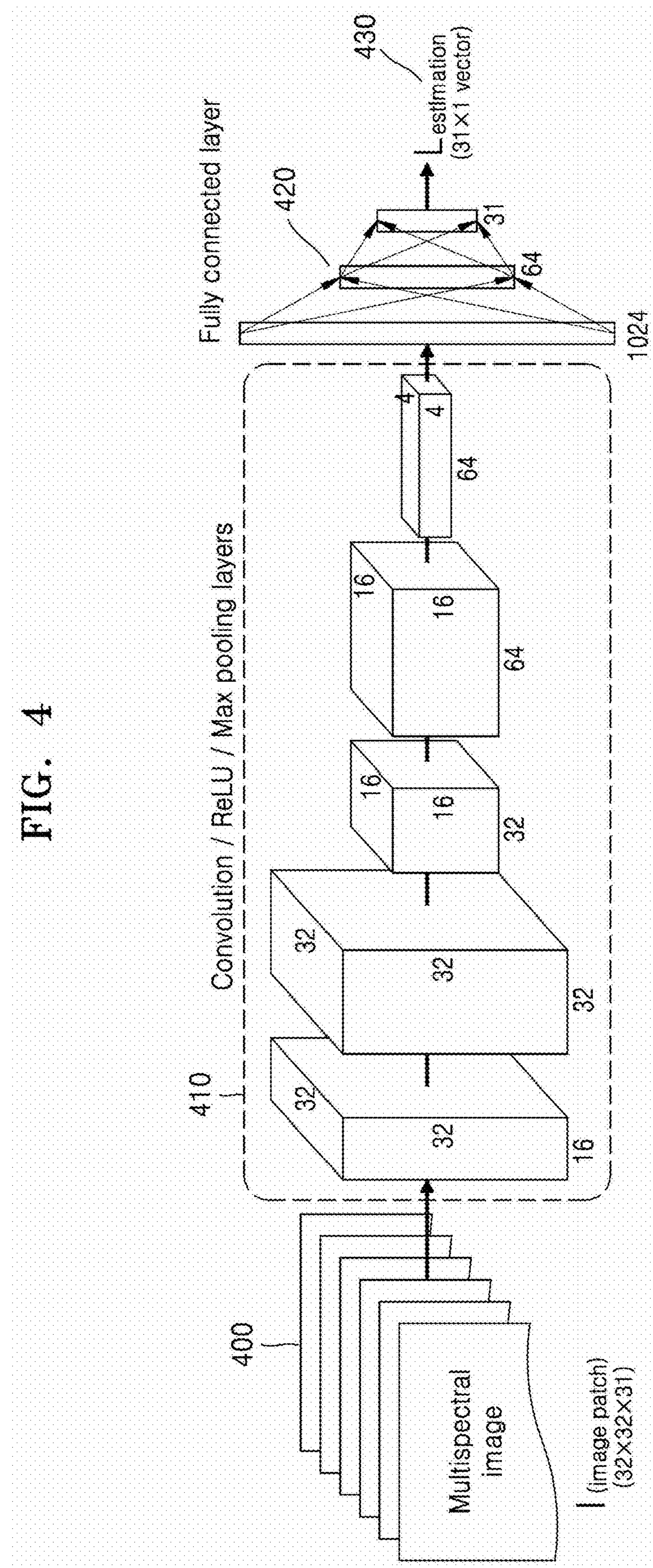
FIG. 4 is a view schematically illustrating a deep learning network for estimating illumination according to an example embodiment.

FIG. 4 is a view schematically illustrating a deep learning network 410 for estimating illumination according to an embodiment.

Referring to FIG. 4, the deep learning network 410 receives multispectral images 400 and outputs illumination information Lestimation 430 through a fully connected layer 420. FIG. 4 shows a process of calculating a 31-dimensional output vector with respect to 31 input channels.

The deep learning network 410 (hereinafter referred to as CCNet) shown in FIG. 4 may include three convolution layers, an ReLU function that is an activation function, and a max pooling layer. An AWB image may be output using Equation 2 below as follows. The CCNet estimates $L_{estimation}$, and then R is calculated from an observed image. Thereafter, the AWB image may be restored by multiplying R by a reference illumination source spectrum.

$$L_{estimation}=\text{CCNet}(I)$$

$$R=I_{observe}/L_{estimation}$$

$$I_{output}=R\times L_{desired} \quad \text{[Equation 2]}$$

A supervised learning method for deep learning networks may be used to optimize parameters of a network through evaluation between a correct illumination spectrum vector for input multispectral images and an estimated illumination spectrum vector output from the network. In this case, the network may aim at minimizing the difference (error) between an actual value and a value estimated by the network. Regression analysis may be used to infer an illumination spectrum vector.

A loss function for evaluation of learning may use one or more of angular loss, L1 loss (mean absolute error (MAE) loss), and L2 loss (mean squared error (MSE) loss).

The network may aim at better learning of the schematic shape of an illumination spectrum by using angular loss (cosine similarity loss(π)). In illumination estimation, the magnitude of illumination refers to relative brightness (intensity), and it may be important to learn the relative difference between illumination values of channels instead of learning the absolute magnitude of illumination. Because angular loss indicates only the difference between the relative orientations of vectors and does not indicate the magnitudes of vectors, angular loss is suitable for considering the above-described characteristics of illumination. Therefore, angular loss, which indicates only the orientations of vectors and does not indicate the magnitudes of vectors, may be used in backpropagation, thereby increasing the learning efficiency of a deep learning network.

In an embodiment, the deep learning network 410 uses a loss function including angular loss (error), L1 loss, and L2 loss, which are described above. L1 loss (MAE loss) and L2 loss (MSE loss), which are commonly used as loss functions in regression models, may be used together with angular loss.

Angular loss may be defined as in Equation 3 below.

$$\text{Angular Loss} = a\cos\left(\frac{L_{GT} \cdot L_{estimation}}{\text{norm}(L_{GT})\text{norm}(L_{estimation})}\right) \quad \text{[Equation 3]}$$

L1 loss may be defined as in Equation 4 below.

$$MAE \text{ Loss} = \frac{1}{N}\sum_{i}^{N}|L_{GT} - L_{estimation}| \quad \text{[Equation 4]}$$

L2 loss may be defined as in Equation 5 below.

$$MSE \text{ Loss} = \frac{1}{N}\sum_{i}^{N}(L_{GT} - L_{estimation})^2 \quad \text{[Equation 5]}$$

Here, $L_{GT}$ refers to ground-truth illumination information on an input image, and $L_{estimation}$ refers to estimated illumination information on an output image.

In an embodiment, a composite data sample may be used to increase the size of a dataset for training. The composite data sample may be prepared as follows.

A reflectance map R may be acquired by one or more of the following methods. A ground-truth value is acquired. The ground-truth value is obtained by estimating the reflectance map R from an image acquired under the illumination of a controlled environment or the sunlight of a daytime environment.

Composite illumination refers to a random illumination spectrum and may be calculated as in Equation 6 below.

$$\text{Random illumination spectrum} = a_1 L_A + a_2 L_{D65} + a_3 L_{LED} + a_4 L_{Flu} \quad \text{[Equation 6]}$$

Here, a1, a2, a3, and a4 refer to randomly generated weight values, and $L_A$, $L_{D65}$, $L_{LED}$, and $L_{Flu}$ refer to illumination spectrums of incandescent illumination, daytime illumination, LED illumination, and fluorescent illumination, respectively. In addition, certain random noises may be added.

A composite image may be obtained by multiplying composite illumination calculated using Equation 6 and the reflectance map R.

An output illumination vector may be obtained by inputting input images to the CCNet shown in FIG. 4 for performing a convolution operation on the input images. In this case, because one network estimates illumination by looking at all input images, this estimation may be called global illumination estimation. In addition to the global illumination estimation, a local illumination estimation method may also be used as follows.

In the local illumination estimation method, input images are first divided in units of patches and then input to an illumination estimation network. When the input images are divided in units of patches and input, the patches may be selectively input to the illumination estimation network. For example, when a particular object or a color histogram is included in a patch, the patch may be input to the illumination estimation network. All of locally-obtained illumination spectra may be added together to construct final illumination. Alternatively, locally-obtained illumination spectra may be selectively added together to construct final illumination. Alternatively, locally-obtained illumination spectra may be weighted-summed to construct final illumination. Alternatively, locally-obtained illumination spectra may be bandpass-filtered such that only some of the locally-obtained illumination spectra may remain, and then remaining illumination spectra may be added together to construct final illumination.

In addition, optionally, a global illumination estimation result and a local illumination estimation result may be used together.

A global illumination estimation result may be combined with locally-obtained illumination spectra to construct final illumination. Alternatively, the global illumination estimation result and the locally-obtained illumination spectra may be selectively combined to construct final illumination. Alternatively, the global illumination estimation result and the locally-obtained illumination spectra may be weighted-summed to construct final illumination. Alternatively, the global illumination estimation result and the locally-obtained illumination spectra may be bandpass-filtered such that only some illumination spectra may remain. Then, the remaining illumination spectra may be added together to construct final illumination.

In addition, all the global regions and local regions of input images may be considered using the kernel sizes of a plurality of networks and the downscale factors of the input images, and a final illumination estimation result may be calculated based thereon.

Figure 5:
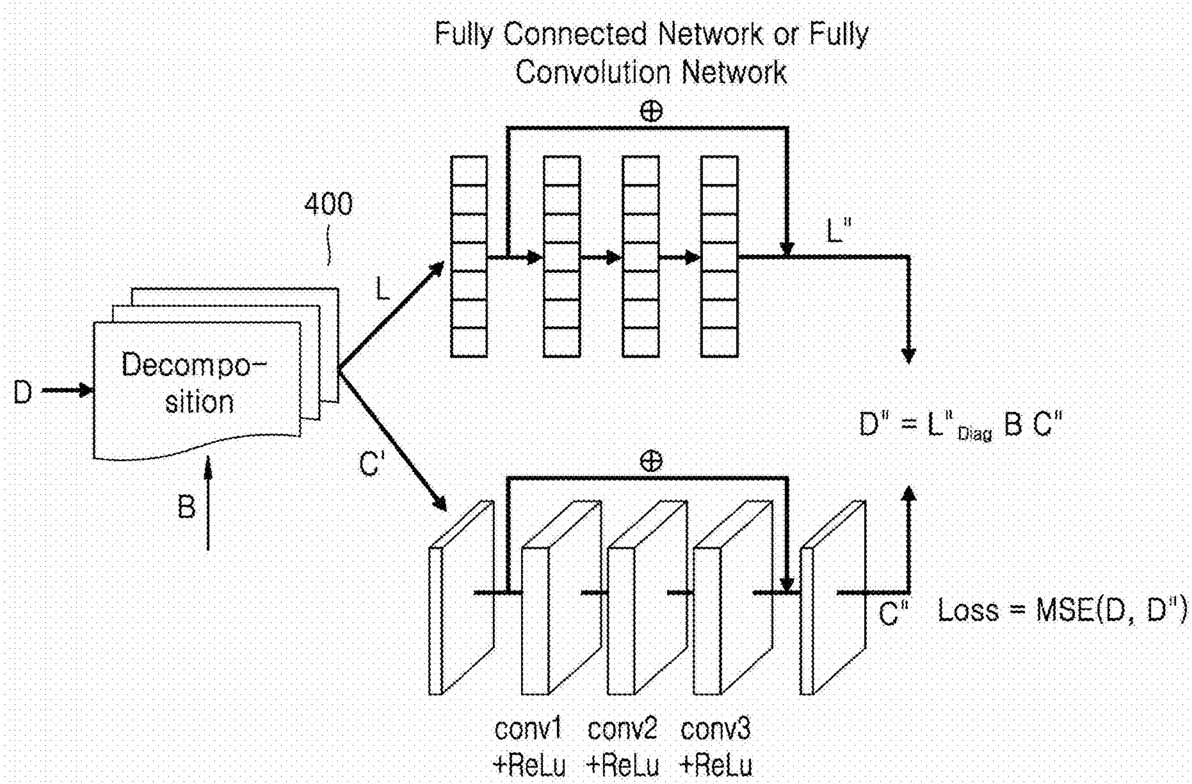
FIG. 5 is a view schematically illustrating a deep learning network for estimating illumination reflectance according to an example embodiment.

FIG. 5 is a view schematically illustrating a deep learning network for estimating illumination reflectance according to an embodiment. In the embodiment, an image observation spectrum may be modeled by combining an illumination spectrum with a reflectance map, and thus AWB may be performed by estimating the reflectance map.

To estimate reflectance map components, an additional deep learning network for estimating a reflectance map may be added to a lower end of the CCNet shown in FIG. 4.

In this case, in an embodiment, a network for estimating a reflectance map R may be constructed. Alternatively, referring to FIG. 5, a previously calculated conversion matrix B may be used to calculate a coefficient C from an output of a network based on the relationship of R=BC, and then an estimated reflectance map BC" may be calculated and multiplied by an estimated illumination vector L" to output an image D". Referring to FIG. 5, B may be obtained by analyzing main components or learning from a separate network.

The deep learning network shown in FIG. 5 may be trained by backpropagation to minimize the difference between an original image D and an estimated image D". As shown in FIGS. 4 and 5, a neural network having two different branches are used for an illumination component and a reflectance component, respectively. However, a final output image may be obtained by exchanging or using feature information between layers to mutually use the feature information for estimation.

Referring to FIG. 5, a final value of the reflectance component is output through successive convolution layers. In this case, however, the final value may be output using additional information such as segmentation or semantic segmentation of images, object detection, or histograms.

Figure 6:
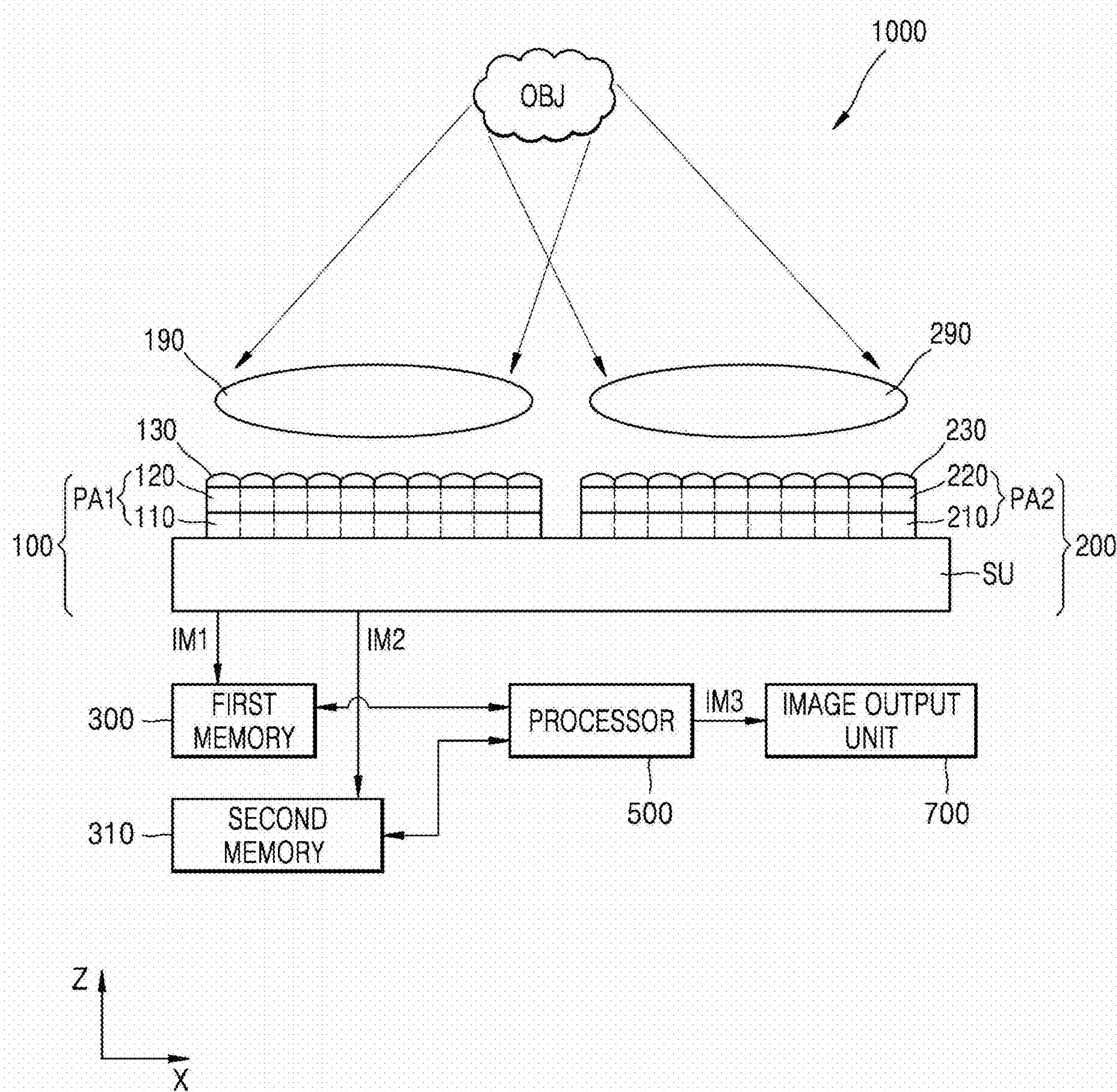
FIG. 6 is a view illustrating a schematic structure of the image acquisition apparatus shown in FIG. 1B.
Figure 7:
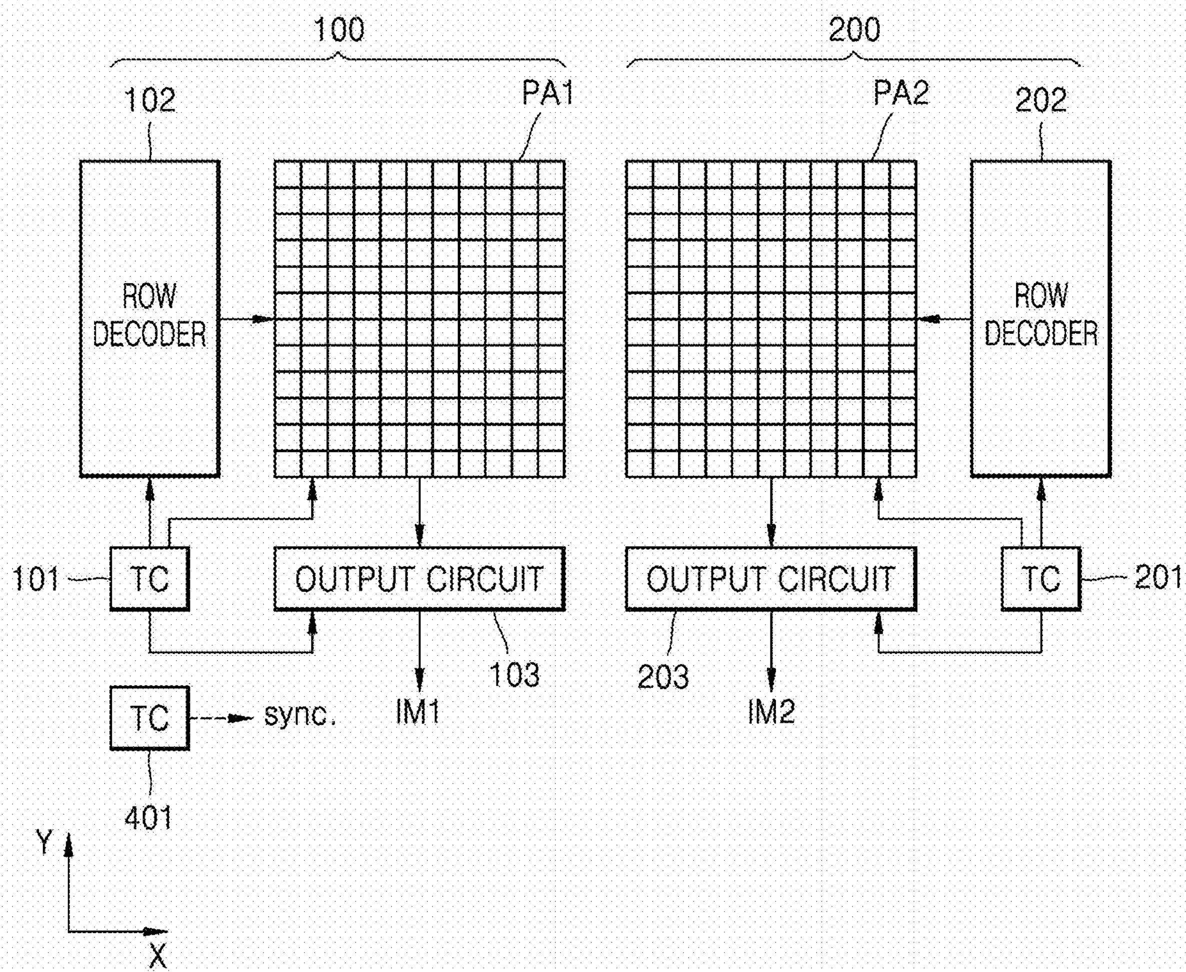
FIG. 7 is a view illustrating circuit configurations of a multispectral image sensor and an image sensor, which are provided in the image acquisition apparatus shown in FIG. 1B.

FIGS. 6 and 7 are views illustrating example configurations of the image acquisition apparatus shown in FIG. 1B. FIG. 6 is a view illustrating a schematic structure of an image acquisition apparatus 1000 according to an embodiment, and FIG. 7 is a view illustrating circuit configurations of an image sensor 200 and a multispectral image sensor 100 of the image acquisition apparatus 1000 according to an embodiment.

The image acquisition apparatus 1000 includes: the multispectral image sensor 100 configured to acquire a first image IM1 based on a first wavelength band of about 10 nm to about 1,000 nm; the image sensor 200 configured to acquire a second image IM2 based on a second wavelength band; and a processor 500 configured to generate a third image IM3 by performing a signal processing process on the first image IM1 and the second image IM2. The image acquisition apparatus 1000 may further include a first memory 300 configured to store data on the first image IM1, a second memory 310 configured to store data on the second image IM2, and an image output unit 700 configured to output images.

The image acquisition apparatus 1000 may further include: a first imaging optical system 190 configured to form an optical image of an object OBJ on the multispectral image sensor 100; and a second imaging optical system 290 configured to form an optical image of the object OBJ on the image sensor 200. Although each of the first imaging optical system 190 and the second imaging optical system 290 is illustrated as including one lens, this is a non-limiting example. The first imaging optical system 190 and the second imaging optical system 290 may be configured to have the same focal length and the same field of view, and in this case, a process of registering the first image IM1 and the second image IM2 to form the third image IM3 may be more easily performed. However, embodiments are not limited thereto.

The multispectral image sensor 100 includes a first pixel array PA1. The first pixel array PA1 includes: a first sensor layer 110, in which a plurality of first sensing elements are arrayed; and a spectral filter 120 arranged on the first sensor layer 110. The spectral filter 120 may include a plurality of filter groups, and each of the plurality of filter groups may include a plurality of unit filters having different transmission wavelength bands. The spectral filter 120 may be configured to perform filtering in a wavelength band wider than a wavelength band in which a color filter 220 of the image sensor 200 performs filtering. For example, in a wavelength band ranging from an ultraviolet wavelength band to an infrared wavelength band, the spectral filter 120 may perform filtering by dividing the wavelength band more finely than the color filter 220. A first micro-lens array 130 may be arranged on the first pixel array PA1. Examples of pixel arrangements of the first pixel array PA1 will be described later with reference to FIGS. 13 to 15.

The image sensor 200 includes a second pixel array PA2. The second pixel array PA2 includes: a second sensor layer 210 in which a plurality of second sensing elements are arrayed; and the color filter 220 arranged on the second sensor layer 210. The color filter 220 may include red filters, green filters, and blue filters, which are alternately arranged. A second micro-lens array 230 may be arranged on the second pixel array PA2. Various examples of pixel arrangements of the second pixel array PA2 will be described later with reference to FIGS. 9 to 11.

Each of the first sensor layer 110 and the second sensor layer 210 may include, but are not limited to, a charge coupled device (CCD) sensor or a CMOS sensor.

The first pixel array PA1 and the second pixel array PA2 may be horizontally arranged on the same circuit board SU, for example, apart from each other in an X direction.

The circuit board SU may include: first circuit elements for processing a signal from the first sensor layer 110; and second circuit elements for processing a signal from the second sensor layer 210. However, embodiments are not limited thereto, and the first circuit elements and the second circuit elements may be respectively provided on separate substrates.

Although the first and second memories 300 and 310 in which data on the first image IM1 and data on the second image IM2 are stored are shown separately from the circuit board SU, this is merely an example, and the first and second memories 300 and 310 may be arranged in the same layer as the first and second circuit elements of the circuit board SU or may be arranged in a layer different from the layer in which the first and second circuit elements are arranged. Each of the first and second memories 300 and 310 may be a line memory configured to store an image line by line, or a frame buffer configured to store the entire image. Each of the first and second memories 300 and 310 may include a static random access memory (SRAM) or a dynamic random access memory (DRAM).

Various circuit elements of the image acquisition apparatus 1000 may be integrated into the circuit board SU. For example, the circuit board SU may include: a logic layer including various analog circuits and digital circuits; and a memory layer in which data is stored. The logic layer and the memory layer may be provided as different layers or the same layer.

Referring to FIG. 7, a row decoder 102, an output circuit 103, and a timing controller (TC) 101 are connected to the first pixel array PA1. The row decoder 102 selects one row of the first pixel array PA1 in response to a row address signal output from the TC 101. The output circuit 103 outputs, in units of columns, photo-sensing signals from a plurality of pixels arranged along a selected row. To this end, the output circuit 103 may include a column decoder and an analog-to-digital converter (ADC). For example, the output circuit 103 may include a plurality of ADCs respectively arranged for columns between the column decoder and the first pixel array PA1, or one ADC arranged at an output terminal of the column decoder. The TC 101, the row decoder 102, and the output circuit 103 may be implemented as one chip or as separate chips. A processor for processing the first image IM1 output through the output circuit 103 may be implemented as a single chip together with the TC 101, the row decoder 102, and the output circuit 103.

A row decoder 202, an output circuit 203, and a TC 201 are also connected to the second pixel array PA2, and a signal from the second pixel array PA2 may be processed as described above. In addition, a processor for processing the second image IM2 output from the output circuit 203 may be implemented as a single chip together with the TC 201, the row decoder 202, and the output circuit 203.

Although the first pixel array PA1 and the second pixel array PA2 are shown in FIG. 7 as having the same size and the same number of pixels, this is merely a non-limiting example for easy of illustration.

When operating two different types of sensors, timing control may be required according to the different resolutions and output speeds of the sensors and the size of a region required for image registration. For example, when one image column is read based on the image sensor 200, an image column of the multispectral image sensor 100 corresponding thereto may have already been stored in a buffer or may need to be read anew. Alternatively, the operations of the image sensor 200 and the multispectral image sensor 100 may be synchronized using the same synchronization signal. For example, a TC 401 may be further provided to transmit a synchronization signal (sync.) to the image sensor 200 and the multispectral image sensor 100.

Figure 8:
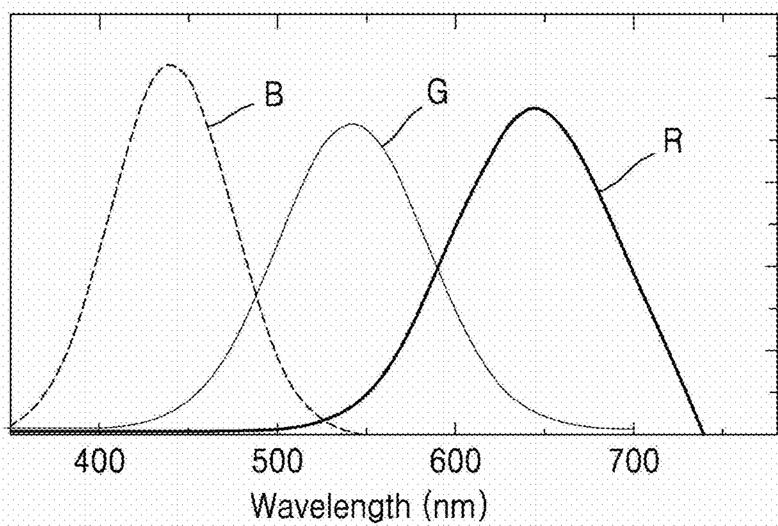
FIG. 8 is a graph illustrating a wavelength spectrum obtained using the image sensor of the image acquisition apparatus according to an example embodiment.
Figure 9:
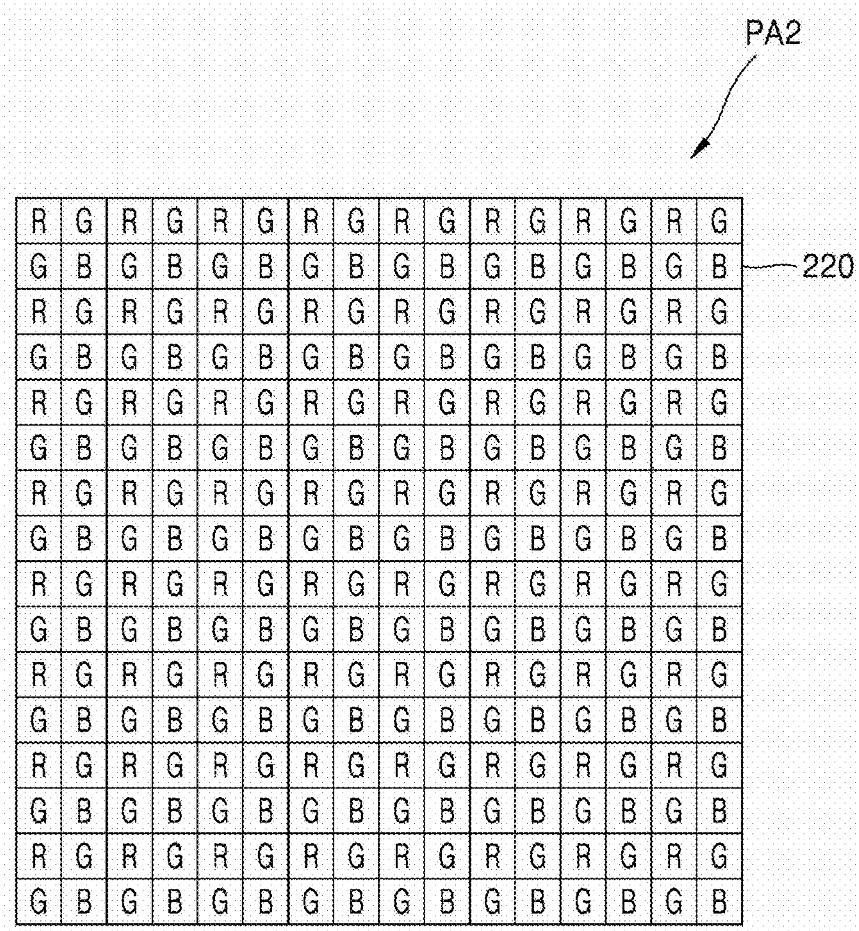
FIGS. 9 to 11 are views illustrating examples of pixel arrangements of the image sensor of the image acquisition apparatus according to example embodiments.
Figure 10:
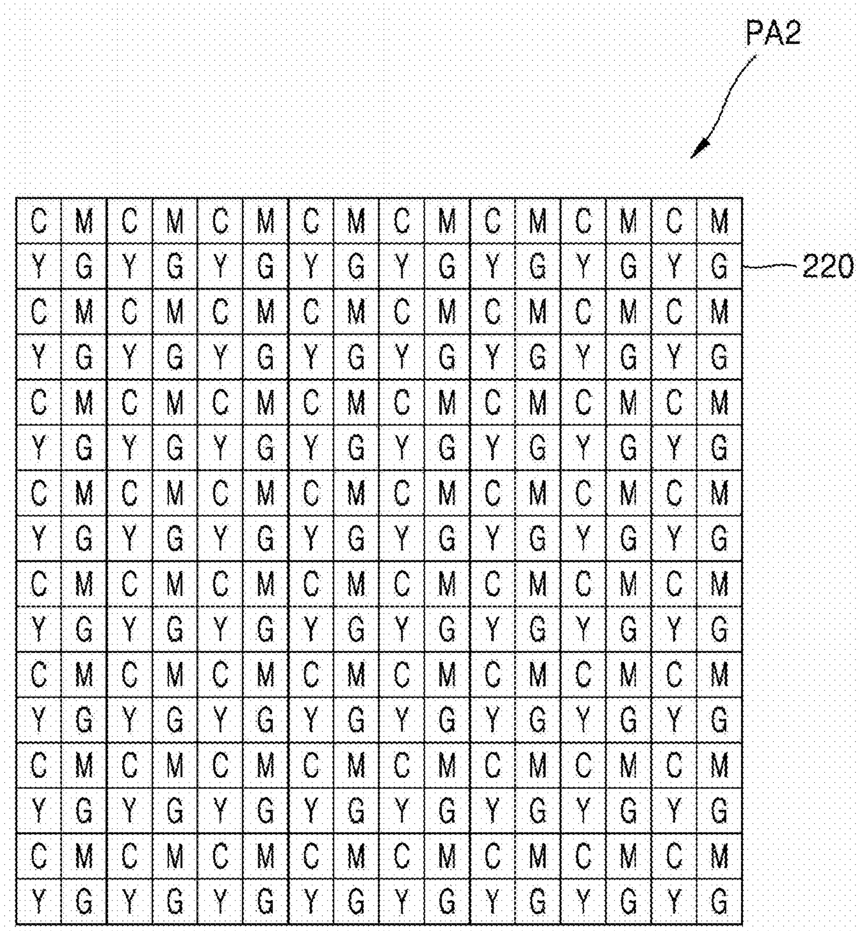
Figure 11:
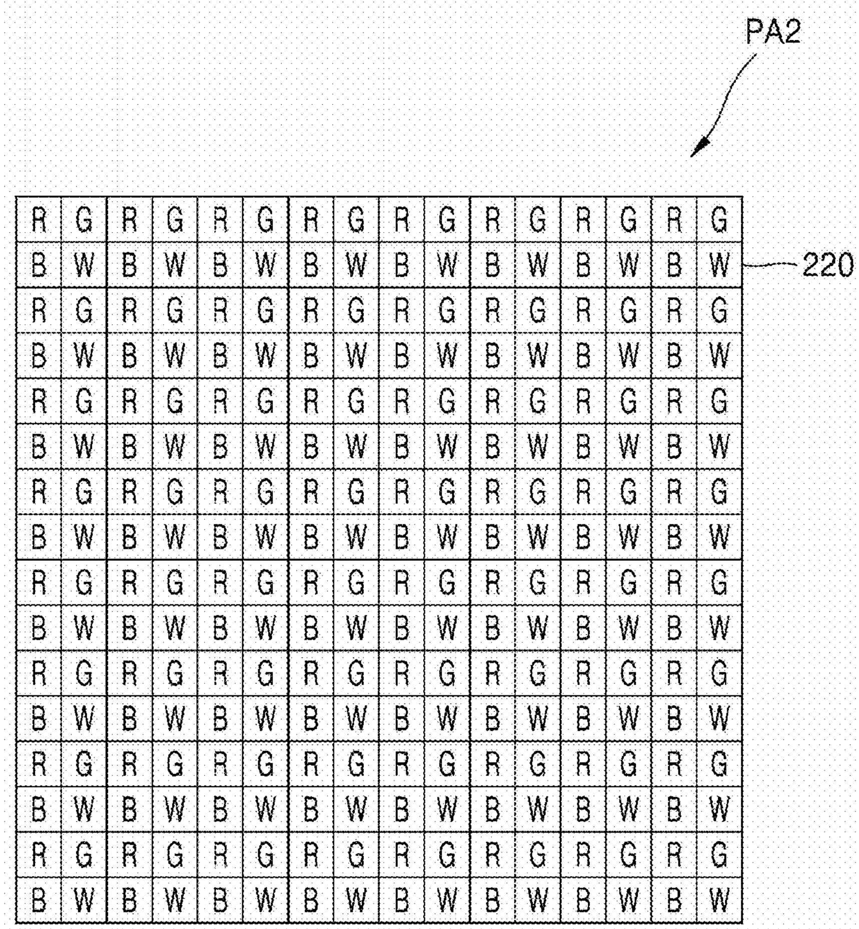

FIG. 8 is a graph illustrating a wavelength spectrum obtained using the image sensor 200 provided in the image acquisition apparatus 1000 according to an embodiment, and FIGS. 9 to 11 are views illustrating examples of pixel arrangements of the image sensor 200 provided in the image acquisition apparatus 1000 according to embodiments.

Referring to FIG. 9, in the color filter 220 provided in the second pixel array PA2, the filters for filtering in the red R, green G, and blue B wavelength bands are arranged in a Bayer pattern. That is, one unit pixel includes sub-pixels arranged in a 2×2 array, and a plurality of unit pixels are repeatedly arranged two-dimensionally. A red filter and a green filter are arranged in a first row of a unit pixel, and a green filter and a blue filter are arranged in a second row. The pixels may be arranged in another pattern other than the Bayer pattern.

For example, referring to FIG. 10, a CYGM arrangement, in which a magenta pixel M, a cyan pixel C, a yellow pixel Y, and a green pixel G form one unit pixel, may also be used. In addition, referring to FIG. 11, an RGBW arrangement, in which a green pixel G, a red pixel R, a blue pixel B, and a white pixel W form one unit pixel, may also be used. Furthermore, although not shown in FIGS. 9 to 11, the unit pixel may have a 3×2 array pattern. In addition, the pixels of the second pixel array PA2 may be arranged in various patterns according to color characteristics of the image sensor 200.

Figure 12:
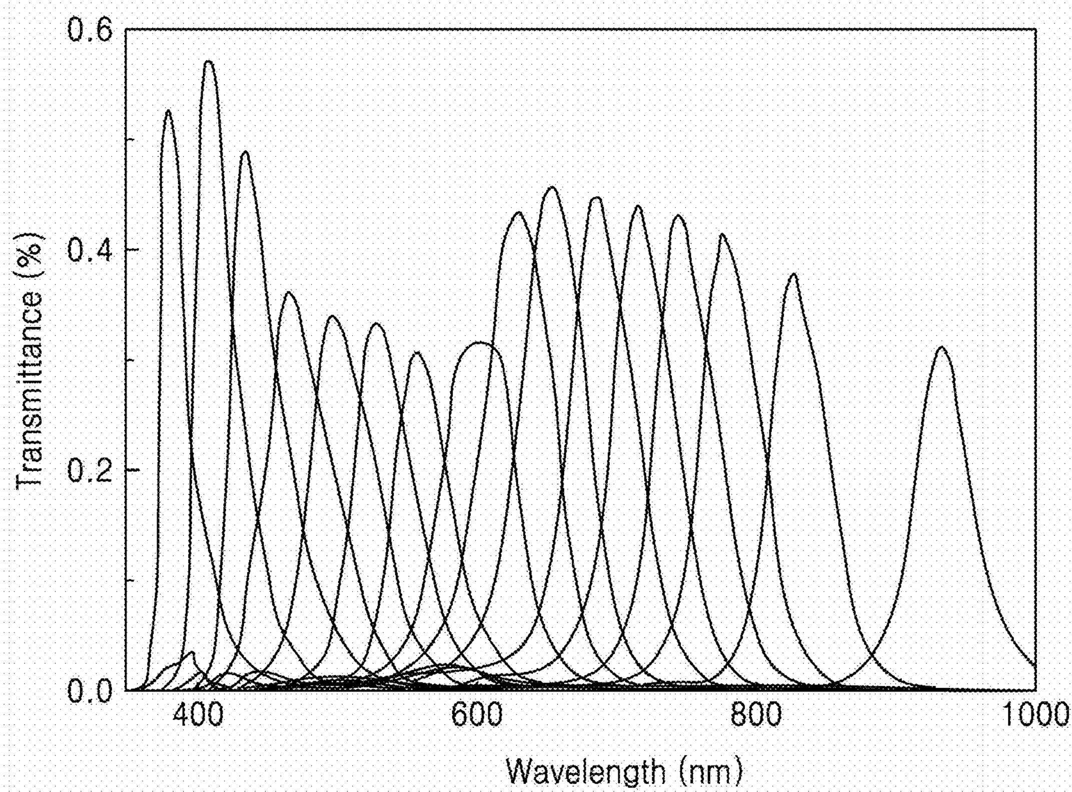
FIG. 12 is a graph illustrating a wavelength spectrum obtained using the multispectral image sensor of the image acquisition apparatus according to an example embodiment.
Figure 13:
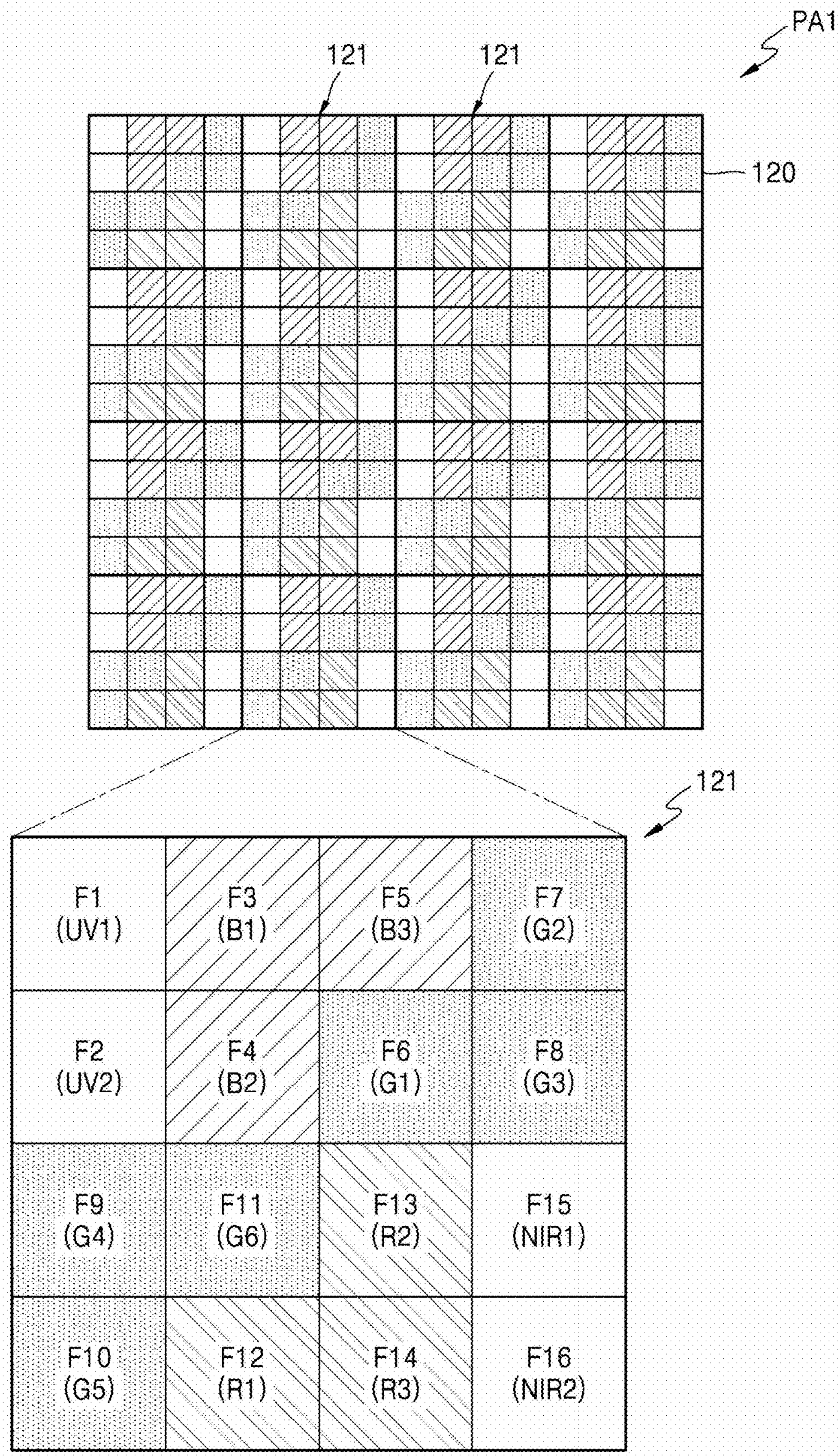
FIGS. 13 to 15 are views illustrating examples of pixel arrangements of the multispectral image sensor of the image acquisition apparatus according to example embodiments.
Figure 14:
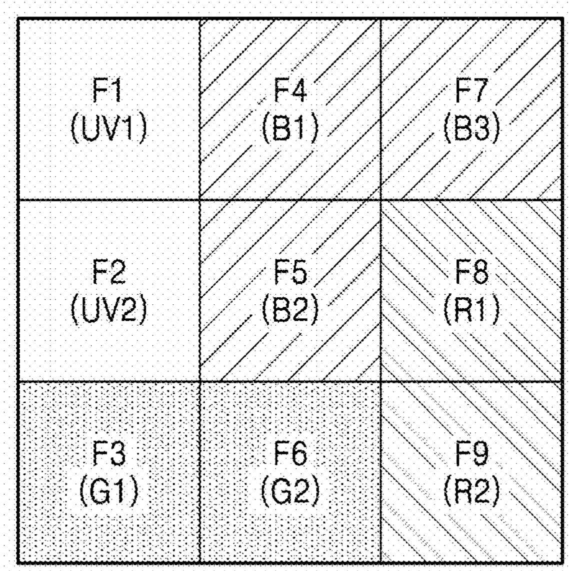
Figure 15:
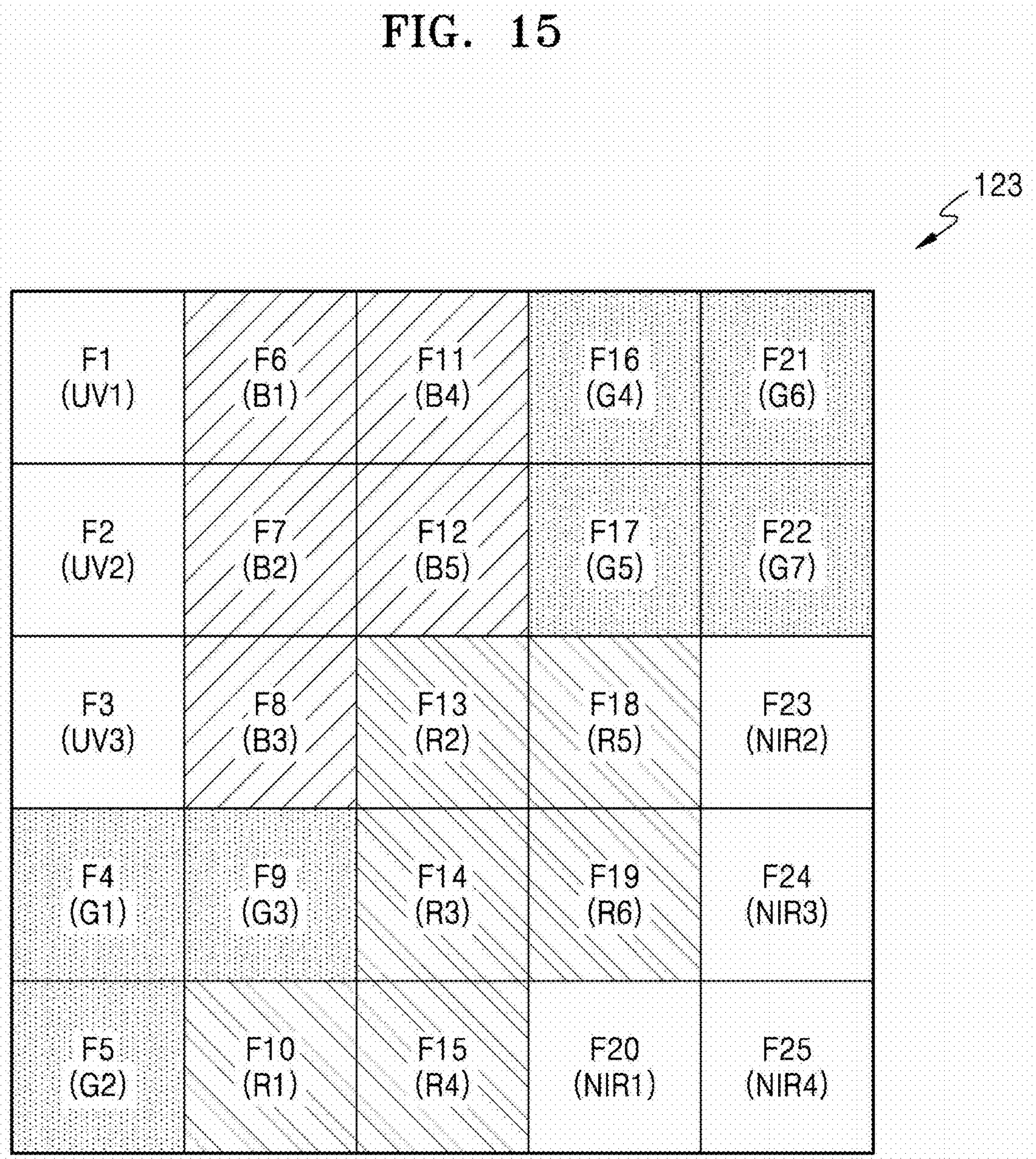

FIG. 12 is a graph illustrating a wavelength spectrum obtained using the multispectral image sensor 100 provided in the image acquisition apparatus 1000 according to an embodiment, and FIGS. 13 to 15 are views illustrating examples of pixel arrangements of the multispectral image sensor 100 provided in the image acquisition apparatus 1000 according to embodiments.

Referring to FIG. 13, the spectral filter 120 provided in the first pixel array PA1 may include a plurality of filter groups 121 arranged in a two-dimensional form. Each of the filter groups 121 may include 16 unit filters, that is, first to sixteenth unit filters F1 to F16 arranged in a 4×4 array.

The first and second unit filters F1 and F2 may respectively have center wavelengths UV1 and UV2 in an ultraviolet region, and the third to fifth unit filters F3 to F5 may respectively have center wavelengths B1 to B3 in a blue light region. The sixth to eleventh unit filters F6 to F11 may respectively have center wavelengths G1 to G6 in a green light region, and the twelfth to fourteenth unit filters F12 to F14 may respectively have center wavelengths R1 to R3 in a red light region. In addition, the fifteenth and sixteenth unit filters F15 and F16 may respectively have center wavelengths NIR1 and NIR2 in a near-infrared region.

FIG. 14 is a plan view illustrating one of filter groups 122 provided in the spectral filter 120 according to another embodiment. Referring to FIG. 14, the filter group 122 may include nine unit filters, that is, first to ninth unit filters F1 to F9 arranged in a 3×3 array. The first and second unit filters F1 and F2 may respectively have center wavelengths UV1 and UV2 in an ultraviolet region, and the fourth, fifth, and seventh unit filters F4, F5, and F7 may respectively have center wavelengths B1 to B3 in a blue light region. The third and sixth unit filters F3 and F6 may respectively have center wavelengths G1 and G2 in a green light region, and the eighth and ninth unit filters F8 and F9 may respectively have center wavelengths R1 and R2 in a red light region.

FIG. 15 is a plan view illustrating one of filter groups 123 provided in the spectral filter 120 according to another embodiment. Referring to FIG. 15, the filter group 123 may include 25 unit filters, that is, first to twenty-fifth F1 to F25 arranged in a 5×5 array. The first to third unit filters F1 to F3 may respectively have center wavelengths UV1 to UV3 in an ultraviolet region, and the sixth, seventh, eighth, eleventh, and twelfth unit filters F6, F7, F8, F11, and F12 may respectively have center wavelengths B1 to B5 in a blue light region. The fourth, fifth and ninth unit filters F4, F5, and F9 may respectively have center wavelengths G1 to G3 in a green light region, and the tenth, thirteenth, fourteenth, fifteenth, eighteenth, and nineteenth unit filters F10, F13, F14, F15, F18, and F19 may respectively have center wavelengths R1 to R6 in a red light region. In addition, the twentieth, twenty-third, twenty-fourth, and twenty-fifth unit filters F20, F23, F24, and F25 may respectively have center wavelengths NIR1 to NIR4 in a near-infrared region.

The above-described unit filters provided in the spectral filter 120 may have a resonance structure having two reflection plates, and the transmission wavelength band of the spectral filter 120 may be determined according to characteristics of the resonance structure. The transmission wavelength band may be adjusted according to the materials of the reflection plates, a dielectric material in a cavity of the resonance structure, and the thickness of the cavity. In addition, another structure such as a structure using a grating or a structure using a distributed Bragg reflector (DBR) may be applied to the unit filters.

Furthermore, the pixels of the first pixel array PA1 may be arranged in various manners according to color characteristics of the multispectral image sensor 100.

Figure 16:
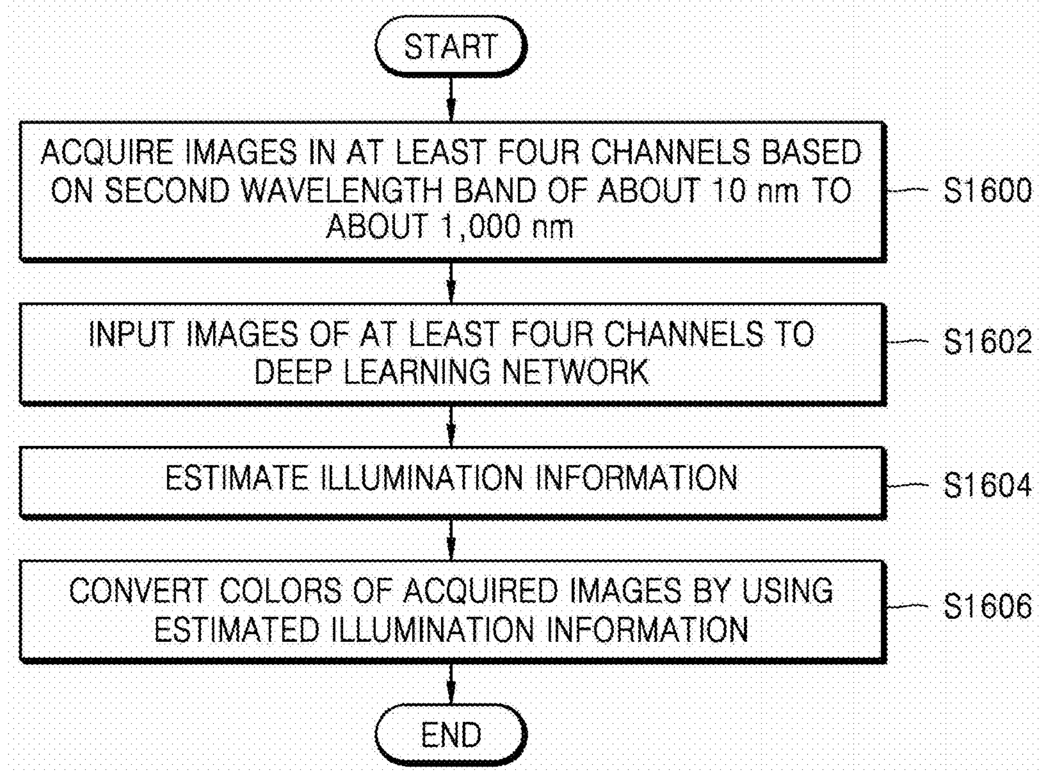
FIG. 16 is a flowchart illustrating a method of controlling an image acquisition apparatus according to an example embodiment.

FIG. 16 is a flowchart schematically illustrating a method of controlling an image acquisition apparatus according to an embodiment.

Referring to FIG. 16, in operation S1600, images are acquired in at least four channels based on a second wavelength band of about 10 nm to about 1,000 nm. Here, the images of at least four channels are acquired using an MSI sensor.

In operation S1602, the images of at least four channels are input to a pre-trained deep learning network. In this case, for example, images of 4 channels, images of 16 channels or images of 31 channels may be input to the pre-trained deep learning network.

In operation S1604, illumination information is estimated. Here, the illumination information may be at least one of an illumination vector corresponding to the intensity of the spectrum of illumination, an XYZ vector indicating the color of illumination, an RGB vector indicating the color of illumination, the color temperature of illumination, or an index value indicating pre-stored illumination information.

In operation S1606, the acquired images are color-converted using the estimated illumination information. Here, the acquired images are four-channel images obtained by using the MSI sensor. In addition, the acquired images may be images obtained by using an additional image sensor, for example, RGB images obtained by using an RGB image sensor.

In the method of controlling an image acquisition apparatus according to the embodiment, multispectral images may be used to reduce overlapping between wavelengths, and in this case, AWB may be performed more effectively than in the case of using RGB color images. In addition, AWB algorithms reflecting not only human visual characteristics but also human perception characteristics may be derived. In addition, when it is difficult to acquire image samples, a neural network training technique may be applied. In addition, preferred image characteristics may be identified by deriving a relationship with subjective AWB-evaluating characteristics as well as objective image-quality-evaluating characteristics. In addition, the method may be used as a precise measurement tool by finding actual reflector characteristics of images that are input under complex light sources. In addition, aesthetic characteristics of colors sensitive to human vision, such as skin colors or natural colors, may be effectively shown in images.

The image acquisition apparatus 1000 described above may be employed in various high-performance optical apparatuses or electronic apparatuses. Examples of the electronic apparatuses may include smartphones, mobile phones, cellular phones, personal digital assistants (PDAs), laptop computers, personal computers (PCs), various portable devices, home appliances, security cameras, medical cameras, automobiles, Internet of Things (IoT) devices, and mobile or non-mobile computing devices, but are not limited thereto.

In addition to the image acquisition apparatus 1000, the electronic apparatuses may further include a processor for controlling image sensors provided therein, for example, an application processor (AP). The electronic apparatuses may control a plurality of hardware or software components by driving an operating system or an application program in the processor and may perform various data processing and operations. The processor may further include a graphics processing unit (GPU) and/or an image signal processor (ISP). When the processor includes an ISP, an image (or video) obtained using an image sensor may be stored and/or output using the processor.

FIG. 17 is a block diagram illustrating a schematic structure of an electronic apparatus ED01 according to an embodiment. Referring to FIG. 17, in a network environment ED00, the electronic apparatus ED01 may communicate with another electronic apparatus ED02 through a first network ED98 (a near-field wireless communication network or the like) or may communicate with another electronic apparatus ED04 and/or a server ED08 through a second network ED99 (a far-field wireless communication network or the like). The electronic apparatus ED01 may communicate with the electronic apparatus ED04 through the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (the display device ED60, etc.) of the components may be omitted from the electronic apparatus ED01, or other components may be added to the electronic apparatus ED01. Some of the components may be implemented in one integrated circuit. For example, the sensor module ED76 (a fingerprint sensor, an iris sensor, an illuminance sensor, etc.) may be embedded in the display device ED76 (a display or the like). In addition, when an image sensor has a spectral function, some sensor-module functions (color sensing, illuminance sensing, etc.) may be implemented in the image sensor instead of being implemented in the sensor module ED76.

The processor ED20 may execute software (a program ED40 or the like) to control one or more other components (hardware or software components, etc.) of the electronic apparatus ED01 connected to the processor ED20, and may perform a variety of data processing or operations. As a portion of the data processing or operations, the processor ED20 may load instructions and/or data received from other components (the sensor module ED76, the communication module ED90, etc.) into a volatile memory ED32, process the instructions and/or data stored in the volatile memory ED32, and store result data in a nonvolatile memory ED34. The processor ED20 may include a main processor ED21 (a central processing unit, an application processor, or the like) and an auxiliary processor ED23 (a GPU, an ISP, a sensor hub processor, a communication processor, or the like), which is operated independently or together with the main processor ED21. The auxiliary processor ED23 may consume less power than the main processor ED21 and may perform specialized functions.

The auxiliary processor ED23 may control functions and/or states related to some (the display device ED60, the sensor module ED76, the communication module ED90, etc.) of the components of the electronic apparatus ED01 on behalf of the main processor ED21 while the main processor ED21 is in an inactive (e.g., sleep) state or together with the main processor ED21 while the main processor ED21 is in an active (e.g., application execution) state. The auxiliary processor ED23 (an ISP, a communication processor or the like) may be implemented as a portion of other functionally relevant components (the camera module ED80, the communication module ED90, etc.).

The memory ED30 may store a variety of data required by the components (the processor ED20, the sensor module ED76, etc.) of the electronic apparatus ED01. The data may include, for example, software (the program ED40, etc.) and input data and/or output data for commands related thereto. The memory ED30 may include the volatile memory ED32 and/or the nonvolatile memory ED34. The nonvolatile memory ED32 may include an internal memory ED36 fixed to the electronic apparatus ED01 and an external memory ED38 removable from the electronic apparatus ED01.

The program ED40 may be stored as software in the memory ED30, and may include an operating system ED42, middleware ED44, and/or an application ED46.

The input device ED50 may receive commands and/or data to be used for the components (the processor ED20, etc.) of the electronic apparatus ED01 from the outside (a user, etc.) of the electronic apparatus ED01. The input device ED50 may include a microphone, a mouse, a keyboard, and/or a digital pen (a stylus pen or the like).

The audio output device ED55 may output an audio signal to the outside of the electronic apparatus ED01. The audio output device ED55 may include a speaker and/or a receiver. The speaker may be used for general purposes such as multimedia playback or record playback, and the receiver may be used to receive incoming calls. The receiver may be provided as a portion of the speaker or may be implemented as a separate device.

The display device ED60 may visually provide information to the outside of the electronic apparatus ED01. The display device ED60 may include a display, a hologram device, or a projector, and a control circuit for controlling devices. The display device ED60 may include touch circuitry set to sense a touch, and/or sensor circuitry (a pressure sensor, etc.) configured to measure the intensity of force generated by the touch.

The audio module ED70 may convert sound into an electrical signal, and vice versa. The audio module ED70 may obtain sound through the input device ED50, or may output sound through the audio output device ED55 and/or speakers and/or headphones of another electronic apparatus (the electronic apparatus ED02 or the like) directly or wirelessly connected to the electronic apparatus ED01.

The sensor module ED76 may detect an operating state (power, temperature, etc.) of the electronic apparatus ED01 or an external environmental state (user status, etc.), and may generate an electrical signal and/or a data value corresponding to the detected state. The sensor module ED76 may include a gesture sensor, a gyro sensor, a barometric sensor, a magnetic sensor, an acceleration sensor, a grip sensor, a proximity sensor, a color sensor, an infrared (IR) sensor, a biological sensor, a temperature sensor, a humidity sensor, and/or an illuminance sensor.

The interface ED77 may support one or more designated protocols, which may be used to directly or wirelessly connect the electronic apparatus ED01 with other electronic apparatuses (the electronic apparatus ED02, etc.). The interface ED77 may include a high definition multimedia interface (HDMI), a universal serial bus (USB) interface, a secure digital (SD) card interface, and/or an audio interface.

A connection terminal ED78 may include a connector through which the electronic apparatus ED01 may be physically connected to other electronic apparatuses (the electronic apparatus ED02, etc.). The connection terminal ED78 may include an HDMI connector, a USB connector, an SD card connector, and/or an audio connector (a headphone connector, etc.).

The haptic module ED79 may convert an electrical signal into a mechanical stimulus (vibration, movement, etc.) or an electrical stimulus that a user may perceive through tactile sensation or kinesthesia. The haptic module ED79 may include a motor, a piezoelectric element, and/or an electric stimulation device.

The camera module ED80 may capture a still image and a moving image. The camera module ED80 may include the image acquisition apparatus 1000 described above, and may further include a lens assembly, an ISP, and/or a flash. The lens assembly included in the camera module ED80 may collect light coming from an object to be imaged.

The power management module ED88 may manage power supplied to the electronic apparatus ED01. The power management module ED88 may be implemented as a portion of a power management integrated circuit PMIC.

The battery ED89 may supply power to components of the electronic apparatus ED01. The battery ED89 may include a non-rechargeable primary battery, a rechargeable secondary battery, and/or a fuel cell.

The communication module ED90 may support establishment of a direct (wired) communication channel and/or a wireless communication channel between the electronic apparatus ED01 and other electronic apparatuses (the electronic apparatus ED02, the electronic apparatus ED04, the server ED08, etc.), and communication through the established communication channel. The communication module ED90 operates independently of the processor ED20 (an application processor, etc.) and may include one or more communication processors supporting direct communication and/or wireless communication. The communication module ED90 may include a wireless communication module ED92 (a cellular communication module, a short-range wireless communication module, a global navigation satellite system (GNSS), or the like) and/or a wired communication module ED94 (a local area network (LAN) communication module, a power line communication module, or the like). A corresponding communication module from among these communication modules may communicate with other electronic apparatuses through the first network ED98 (a local area network such as Bluetooth, WiFi Direct, or infrared data association (IrDA)) or the second network ED99 (a telecommunication network such as a cellular network, the Internet, or computer networks (LAN, WAN, etc.)). These various types of communication modules may be integrated into a single component (a single chip or the like) or may be implemented as a plurality of separate components (multiple chips). The wireless communication module ED92 may identify and authenticate the electronic apparatus ED01 within a communication network such as the first network ED98 and/or the second network ED99 using subscriber information (an international mobile subscriber identifier (IMSI), etc.) stored in the subscriber identification module ED96.

The antenna module ED97 may transmit and/or receive signals and/or power to and/or from the outside (other electronic apparatuses, etc.). An antenna may include a radiator made of a conductive pattern formed on a substrate (a PCB, etc.). The antenna module ED97 may include one or more such antennas. When a plurality of antennas are included in the antenna module ED97, the communication module ED90 may select an antenna suitable for a communication method used in a communication network, such as the first network ED98 and/or the second network ED99, among the plurality of antennas. Signals and/or power may be transmitted or received between the communication module ED90 and other electronic apparatuses through the selected antenna. Other components (an RFIC, etc.) besides the antenna may be included as part of the antenna module ED97.

Some of the components may be connected to each other and exchange signals (commands, data, etc.) through a communication method between peripheral devices (a bus, general purpose input and output (GPIO), a serial peripheral interface (SPI), a mobile industry processor interface (MIPI), or the like).

Commands or data may be transmitted or received between the electronic apparatus ED01 and an external apparatus such as the electronic apparatus ED04 through the server ED08 connected to the second network ED99. The other electronic apparatuses ED02 and ED04 may be the same as or different from the electronic apparatus ED01. All or some of the operations of the electronic apparatus ED01 may be executed by one or more of the other electronic apparatuses ED02 and ED04. For example, when the electronic apparatus ED01 needs to perform certain functions or services, the electronic apparatus ED01 may request one or more other electronic apparatuses to perform some or all of the functions or services instead of directly executing the functions or services. One or more other electronic apparatuses that have received the request may execute an additional function or service related to the request, and may transfer results of the execution to the electronic apparatus ED01. To this end, cloud computing, distributed computing, and/or client-server computing techniques may be used.

Figure 18:
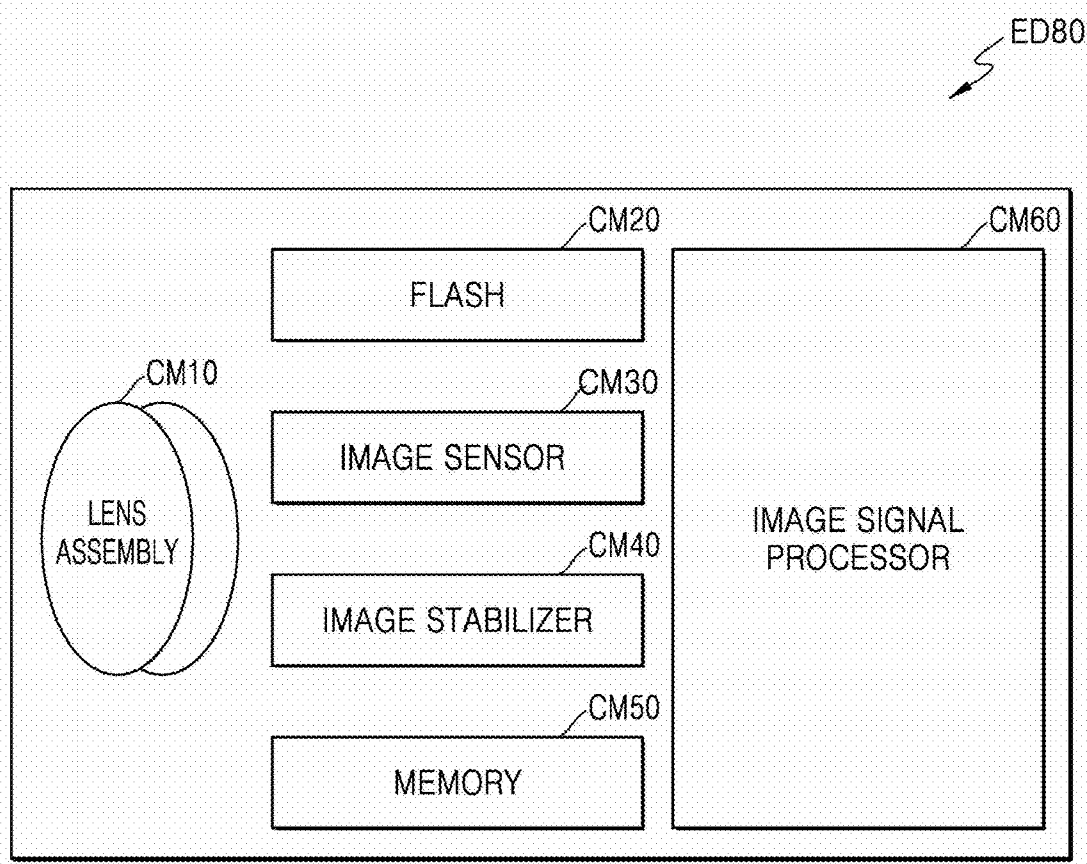
FIG. 18 is a block diagram schematically illustrating a camera module included in the electronic apparatus of FIG. 17.

FIG. 18 is a block diagram schematically illustrating the camera module ED80 included in the electronic apparatus ED01 shown in FIG. 17. The camera module ED80 may include the image acquisition apparatus 1000 described above, or may have a structure modified therefrom. Referring to FIG. 18, the camera module ED80 may include a lens assembly CM10, a flash CM20, an image sensor CM30, an image stabilizer CM40, a memory CM50 (a buffer memory, etc.), and/or an ISP CM60.

The image sensor CM30 may include the multispectral image sensor 100 and the image sensor 200 which are provided in the image acquisition apparatus 1000 described above. The multispectral image sensor 100 and the image sensor 200 may obtain an image corresponding to an object by converting light emitted or reflected from the object and transmitted through the lens assembly CM10 into an electrical signal. The image sensor 200 may be used to obtain RGB images, and the multispectral image sensor 100 may be used to obtain hyperspectral images in a an ultraviolet-to-infrared wavelength range.

In addition to the multispectral image sensor 100 and the image sensor 200 described above, the image sensor CM30 may further include one or more sensors selected from image sensors having different properties, such as another RGB image sensor, a black and white (BW) sensor, an infrared sensor, or an ultraviolet sensor. Each of the sensors included in the image sensor CM30 may be implemented as a CCD sensor and/or a CMOS sensor.

The lens assembly CM10 may collect light coming from an object to be imaged. The camera module ED80 may include a plurality of lens assemblies CM10, and in this case, the camera module ED80 may be a dual camera, a 360-degree camera, or a spherical camera. Some of the plurality of lens assemblies CM10 may have the same lens properties (field of view, focal length, autofocus, F Number, optical zoom, etc.) or different lens properties. Each of the lens assemblies CM10 may include a wide-angle lens or a telephoto lens.

The lens assembly CM10 may be configured and/or focused such that two image sensors included in the image sensor CM30 may form optical images of an object at the same position.

The flash CM20 may emit light used to enhance light emitted or reflected from an object. The flash CM20 may include one or more light emitting diodes (a red-green-blue (RGB) LED, a white LED, an infrared LED, an ultraviolet LED, etc.), and/or a xenon lamp.

The image stabilizer CM40 may move one or more lenses included in the lens assembly CM10 or the image sensor CM30 in a specific direction in response to a movement of the camera module ED80 or the electronic apparatus ED01 including the camera module ED80, or may control operating characteristics of the image sensor CM30 (adjustment of read-out timing, etc.) to compensate for negative effects caused by movement. The image stabilizer CM40 may detect a movement of the camera module ED80 or the electronic apparatus ED01 by using a gyro sensor (not shown) or an acceleration sensor (not shown) arranged inside or outside the camera module ED80. The image stabilizer CM40 may be an optical image stabilizer.

In the memory CM50, some or all of data obtained through the image sensor 1000 may be stored for the next image processing operation. For example, when a plurality of images are obtained at a high speed, the obtained original data (Bayer-patterned data, high-resolution data, or the like) may be stored in the memory CM50 and only a low-resolution image may be displayed. Then, the original data of a selected image (user selection, etc.) may be transferred to the ISP CM60. The memory CM50 may be integrated into the memory ED30 of the electronic apparatus ED01 or may be configured as a separate memory that may be independently operated.

The ISP CM60 may perform one or more image processes on an image obtained through the image sensor CM30 or image data stored in the memory CM50. As described with reference to FIGS. 1 to 17, a first image (e.g., an RGB image) and a second image (e.g., an MSI image) obtained using two image sensors included in the image sensor CM30 are processed to form a white-balanced third image. To this end, components of the processor 500 may be included in the ISP CM60.

In addition, the one or more image processes may include depth map generation, three-dimensional modeling, panorama generation, feature point extraction, image composition, and/or image compensation (noise reduction, resolution adjustment, brightness adjustment, blurring, sharpening, softening, etc.). The ISP CM60 may control (exposure time control, read-out timing control, etc.) components (the image sensor CM30, etc.) included in the camera module CM80. An image processed by the ISP CM60 may be stored again in the memory CM50 for additional processing or may be provided to external components (the memory ED30, the display device ED60, the electronic apparatus ED02, the electronic apparatus ED04, the server ED08, etc.) of the camera module ED80. The ISP CM60 may be integrated into the processor ED20 or may be configured as a separate processor that operates independently of the processor ED20. When the ISP CM60 is provided separately from the processor ED20, an image processed by the ISP CM60 may be displayed on the display device ED60 after being further processed by the processor ED20.

The electronic apparatus ED01 may include a plurality of camera modules ED80 having different attributes or functions. In this case, one of the plurality of camera modules ED80 may be a wide-angle camera, and another of the plurality of camera modules ED80 may be a telephoto camera. Similarly, one of the plurality of camera modules ED80 may be a front camera, and another of the plurality of camera modules ED80 may be a rear camera.

FIGS. 19 to 28 are views illustrating various examples of an electronic apparatus to which the image acquisition apparatus 1000 is applied according to example embodiments.

Figure 19:
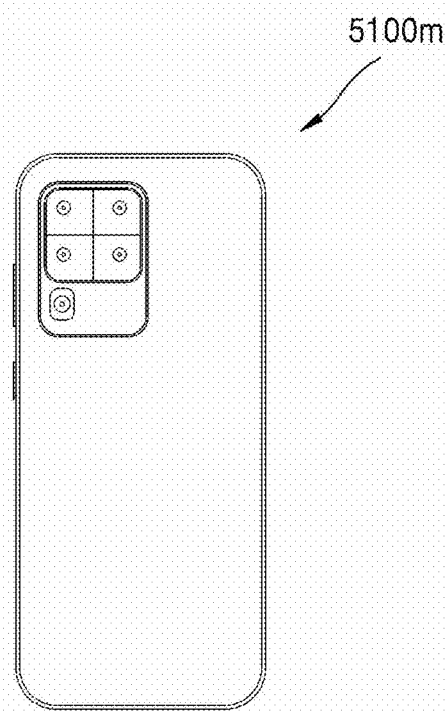
FIGS. 19 to 28 are views illustrating various examples of an electronic apparatus including an image acquisition apparatus according to example embodiments.
Figure 20:
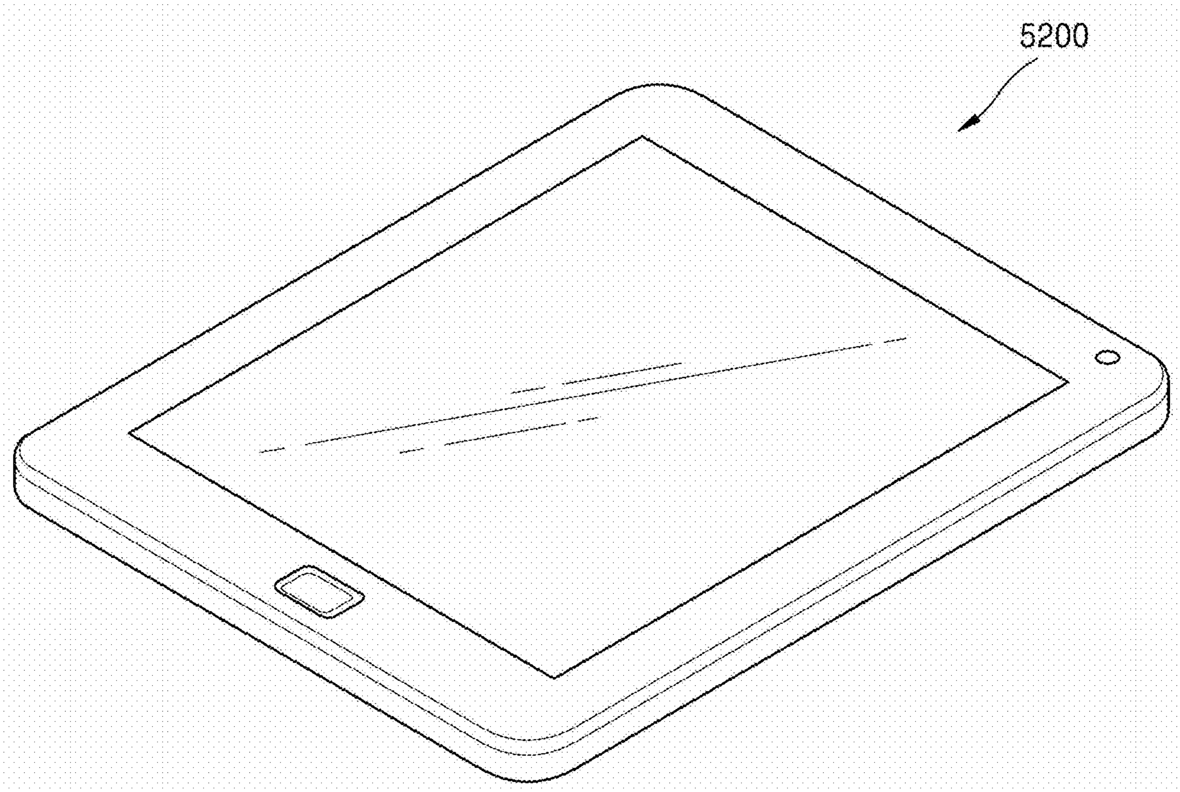
Figure 21:
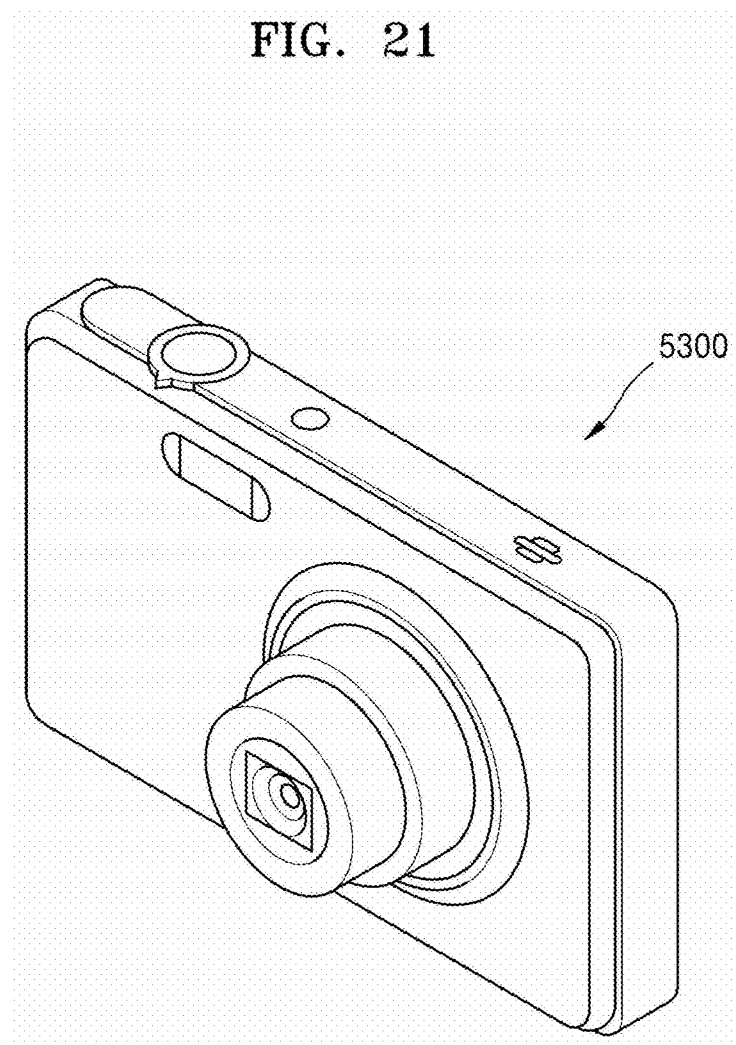
Figure 22:
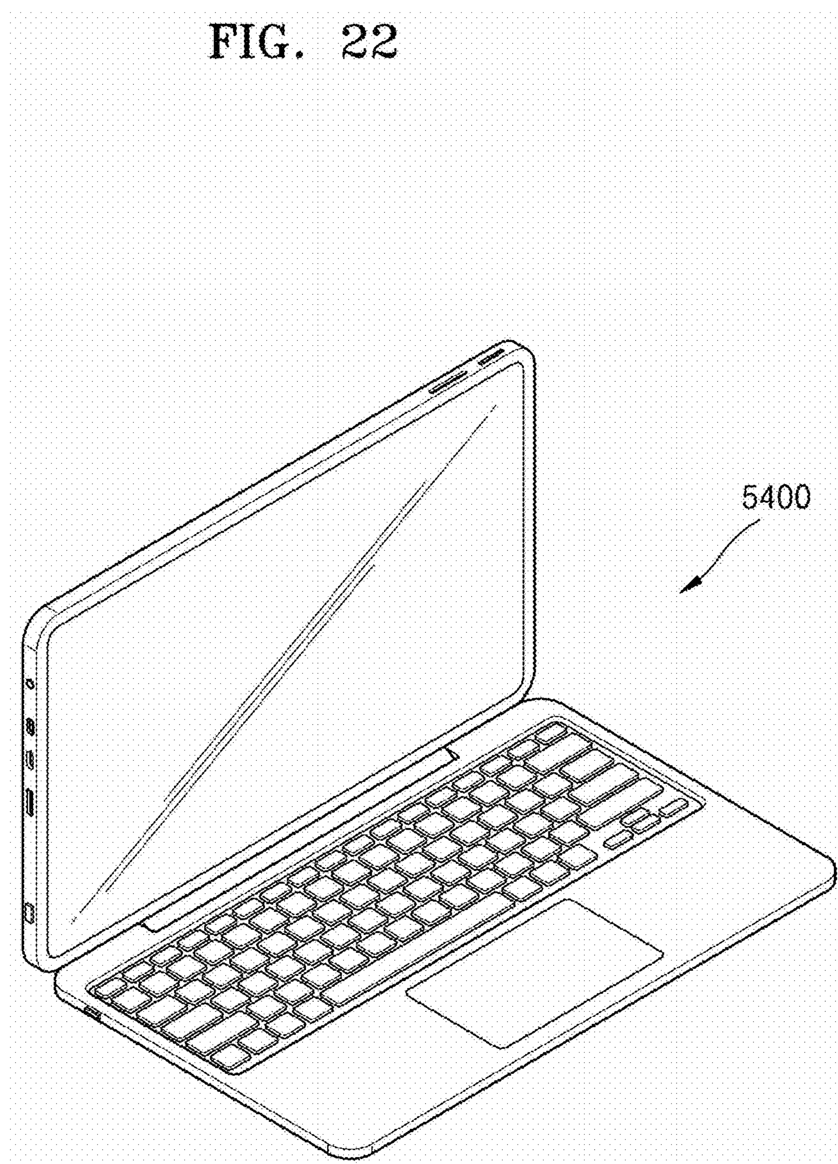
Figure 23:
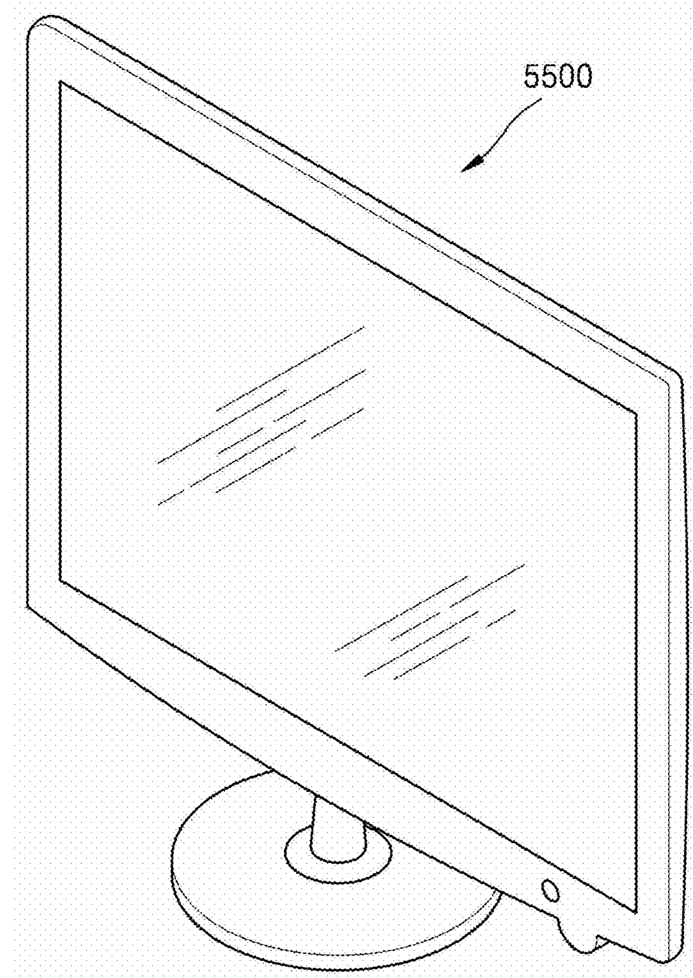

According to example embodiments, the image acquisition apparatus 1000 may be applied to a mobile phone or smartphone 5100*m* shown in FIG. 19, a tablet or smart tablet 5200 shown in FIG. 20, a digital camera or camcorder 5300 shown in FIG. 21, a laptop computer 5400 shown in FIG. 22, or a television or smart television 5500 shown in FIG. 23. For example, the smartphone 5100*m* or the smart tablet 5200 may include a plurality of high-resolution cameras each having a high-resolution image sensor mounted thereon. The high-resolution cameras may be used to extract depth information of objects in an image, adjust out of focus of an image, or automatically identify objects in an image.

Figure 24:
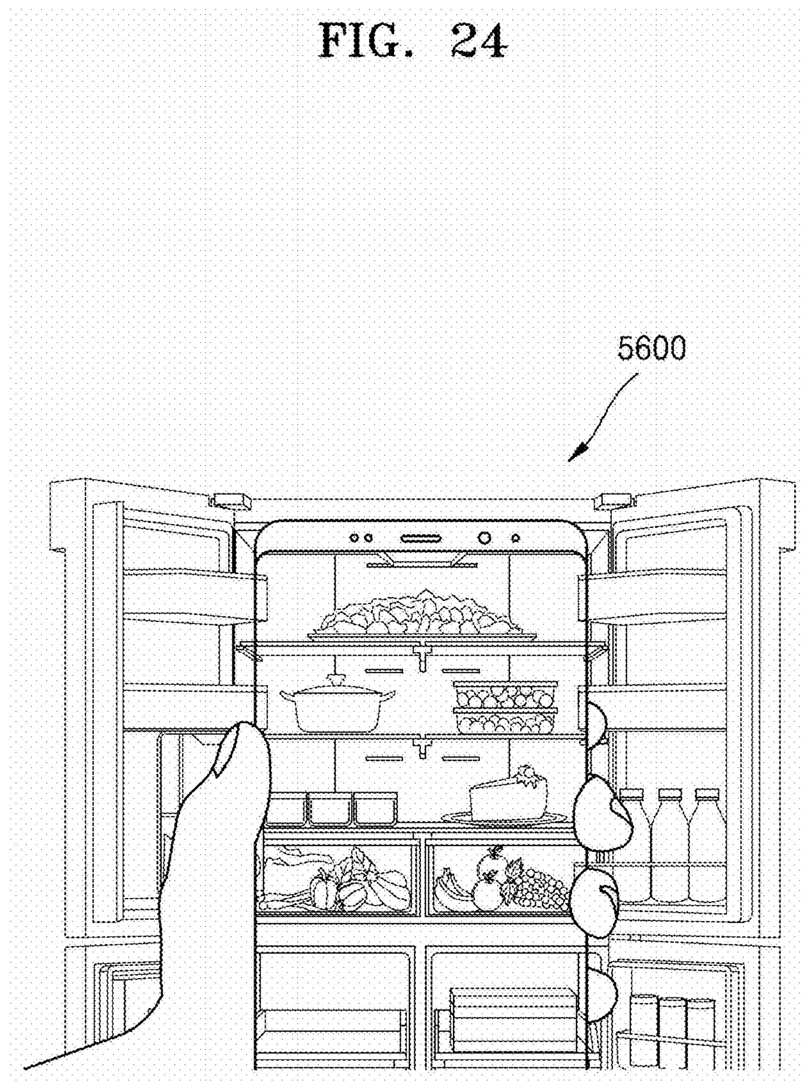
Figure 25:
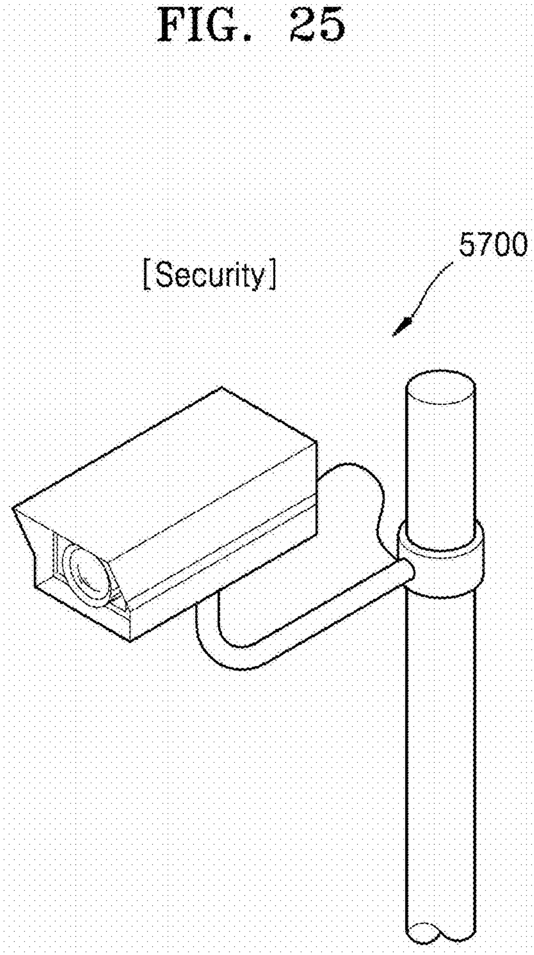
Figure 26:
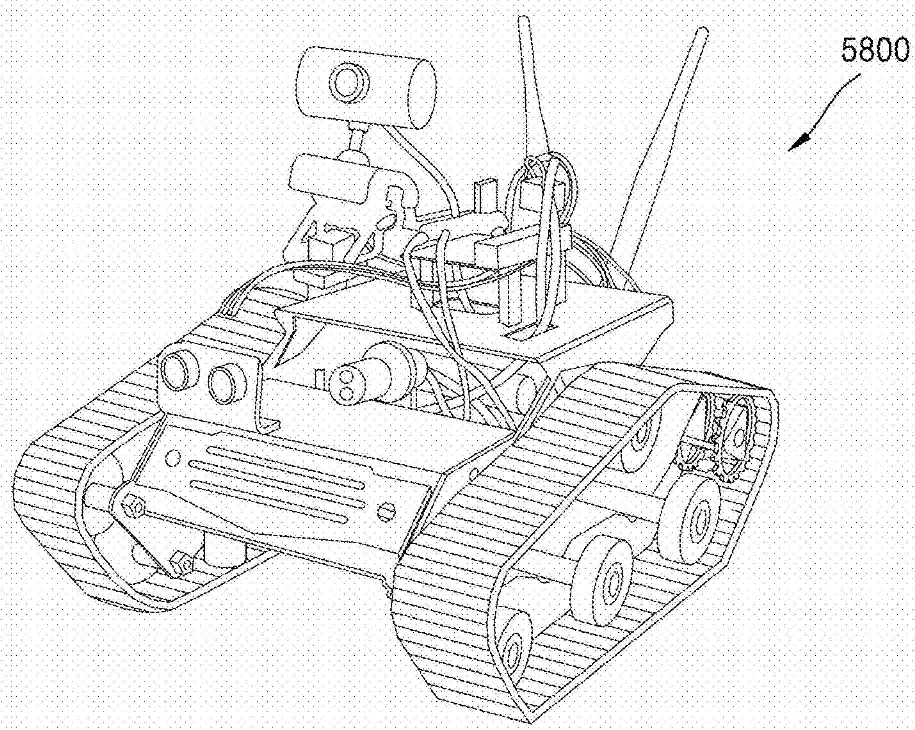
Figure 27:
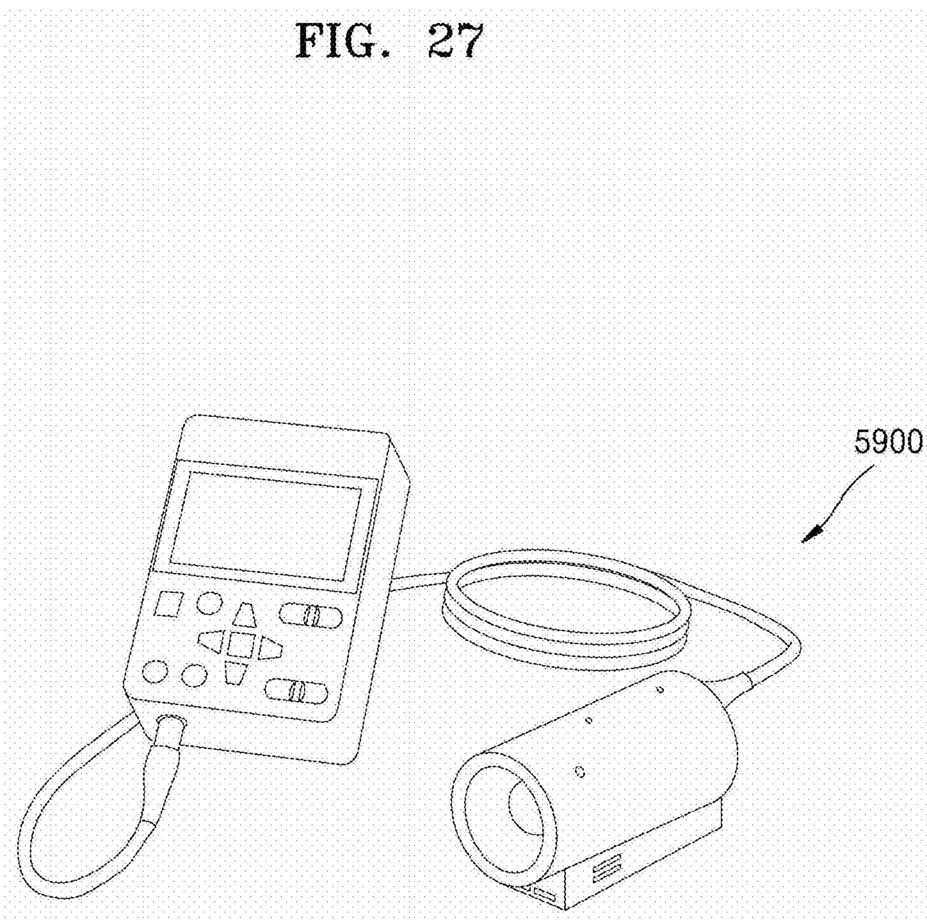

In addition, the image acquisition apparatus 1000 may be applied to a smart refrigerator 5600 shown in FIG. 24, a security camera 5700 shown in FIG. 25, a robot 5800 shown in FIG. 26, a medical camera 5900 shown in FIG. 27, or the like. For example, the smart refrigerator 5600 may automatically recognize food contained in the smart refrigerator 5600 by using the image acquisition apparatus 1000, and may inform a user of whether a specific food is contained in the smart refrigerator 5600, the type of food put into or out of the smart refrigerator 5600, and the like through a smartphone. The security camera 5700 may provide an ultra-high-resolution image and may recognize an object or a person in the ultra-high-resolution image even in a dark environment owing to high sensitivity of the security camera 5700 The robot 5800 may be sent to a disaster or industrial site that cannot be directly accessed by humans and may provide high-resolution images. The medical camera 5900 may provide a high-resolution image for diagnosis or surgery, and may have a dynamically adjustable field of view.

Figure 28:
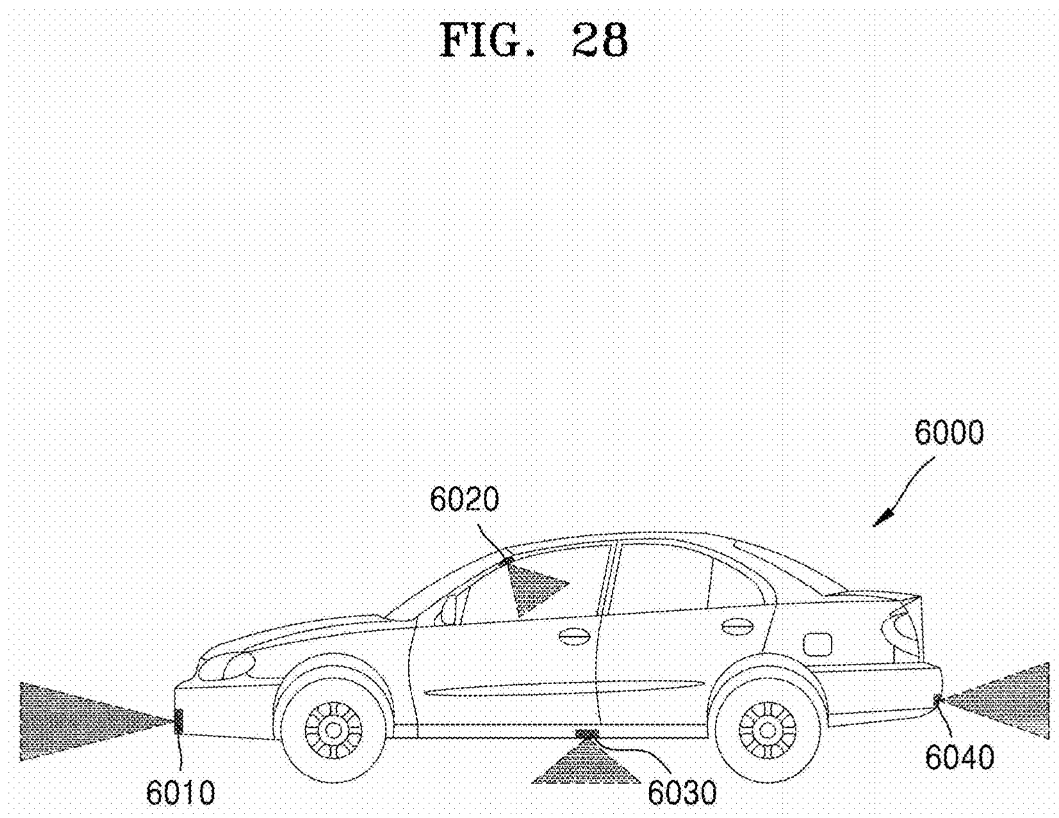

In addition, the image acquisition apparatus 1000 may be applied to a vehicle 6000 as shown in FIG. 28. The vehicle 6000 may include a plurality of vehicle cameras 6010, 6020, 6030, and 6040 arranged at various positions. Each of the vehicle cameras 6010, 6020, 6030, and 6040 may include an image acquisition apparatus according to an example embodiment. The vehicle 6000 may use the vehicle cameras 6010, 6020, 6030, and 6040 to provide a driver with various information about the interior or surroundings of the vehicle 6000, and may provide information related to autonomous driving by automatically recognizing objects or people in images.

As described above, according to one or more example embodiments, the image acquisition apparatus reduces overlapping between wavelengths by using a multispectral image sensor and may thus perform AWB more effectively than in the case of using RGB images.

In addition, AWB algorithms reflecting not only human visual characteristics but also human perception characteristics may be derived.

The image acquisition apparatus may be employed in various electronic apparatuses.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image acquisition apparatus comprising:

a multispectral image sensor configured to acquire images of at least four channels based on a wavelength band of 10 nm to 1,000 nm; and a processor configured to estimate illumination information of the images by inputting the images of at least four channels to a deep learning network trained in advance, and convert colors of the acquired images using the estimated illumination information, wherein the estimated illumination information comprises local illumination information estimated by dividing the images in units of patches, and selectively inputting at least one patch among the patches to the deep learning network, and wherein the at least one patch is selectively input to the deep learning network based on an object included in the at least one patch and a color histogram of the at least one patch.

2. The image acquisition apparatus of claim 1, wherein the multispectral image sensor is further configured to acquire images in 16 channels, and the processor is further configured to input the images of 16 channels received from the multispectral image sensor to the deep learning network, to estimate the illumination information.

3. The image acquisition apparatus of claim 2, wherein the processor is further configured to generate images in 31 channels by interpolation using the acquired images of 16 channels, and input the images of 31 channels to the deep learning network, to estimate the illumination information.

4. The image acquisition apparatus of claim 1, wherein the illumination information comprises at least one of an illumination vector corresponding to an illumination spectrum intensity, an XYZ vector indicating an illumination color, an RGB vector indicating an illumination color, an illumination color temperature, or an index value indicating pre-stored illumination information.

5. The image acquisition apparatus of claim 1, wherein the processor is further configured to input, to the deep learning network, images sampled at given intervals in a wavelength band corresponding to the images of at least four channels or images obtained by normalizing the images of at least four channels.

6. The image acquisition apparatus of claim 1, wherein the deep learning network comprises at least three convolution layers, a rectified linear unit function that is an activation function, and a max pooling layer.

7. The image acquisition apparatus of claim 1, wherein the deep learning network is trained in advance using a loss function comprising an angular loss or error, an L1 loss, and an L2 loss.

8. The image acquisition apparatus of claim 7, wherein the angular loss is calculated by Equation 3 below:

$$\text{Angular Loss} = a\cos\left(\frac{L_{GT} \cdot L_{estimation}}{\text{norm}(L_{GT})\text{norm}(L_{estimation})}\right) \quad \text{[Equation 3]}$$

the L1 loss is calculated by Equation 4 below:

$$MAE\ \text{Loss} = \frac{1}{N}\sum_{i}^{N}|L_{GT} - L_{estimation}| \quad \text{[Equation 4]}$$

the L2 loss is calculated by Equation 5 below:

$$MSE\ \text{Loss} = \frac{1}{N}\sum_{i}^{N}(L_{GT} - L_{estimation})^2 \quad \text{[Equation 5]}$$

where $L_{GT}$ is ground-truth illumination information on an input image, and $L_{estimation}$ is estimated illumination information on an output image.

9. The image acquisition apparatus of claim 1, wherein the processor is further configured to generate a composite image by multiplying pre-calculated composite illumination by a reflectance map, to provide training images for the deep learning network.

10. The image acquisition apparatus of claim 9, wherein the reflectance map is obtained based on illumination information in a controlled environment or illumination information in an image acquired under daytime sunlight.

11. The image acquisition apparatus of claim 1, further comprising an image sensor configured to acquire an image based on a first wavelength band, wherein the processor is further configured to convert colors of the image acquired by the image sensor by using the estimated illumination information.

12. The image acquisition apparatus of claim 1, wherein the estimated illumination information comprises global illumination information estimated based on all the images input to the deep learning network.

13. The image acquisition apparatus of claim 1, wherein the estimated illumination information of the images comprises one of a final result obtained by adding up a global illumination estimation result and local illumination estimation results, a final result obtained by selectively adding up the global illumination estimation result and the local illumination estimation results, a final result obtained by weighting and adding up the global illumination estimation result and the local illumination estimation results, and a final result obtained by bandpass filtering the global illumination estimation result and the local illumination estimation results.

14. The image acquisition apparatus of claim 1, further comprising a separate deep learning network configured to estimate a reflectance map.

15. The image acquisition apparatus of claim 14, wherein the processor is configured to acquire color-converted images using the estimated illumination information and the estimated reflectance map.

16. An electronic apparatus comprising the image acquisition apparatus of claim 1.

17. An image acquisition apparatus comprising:

a multispectral image sensor configured to acquire images of at least four channels based on a wavelength band of 10 nm to 1,000 nm; and a processor configured to estimate illumination information of the images by inputting the images of at least four channels to a deep learning network trained in advance, and convert colors of the acquired images using the estimated illumination information, wherein the processor is further configured to generate a composite image by multiplying pre-calculated composite illumination by a reflectance map, to provide training images for the deep learning network, and wherein the pre-calculated composite illumination has a random illumination spectrum calculated by Equation 6 below:

$$\text{Random illumination spectrum} = a_1 L_A + a_2 L_{D65} + a_3 L_{LED} + a_4 L_{Flu} \quad \text{[Equation 6]}$$

where a1, a2, a3, and a4 are randomly generated weight values, and $L_A$, $L_{D65}$, $L_{LED}$, and $L_{Flu}$ are illumination spectrums of incandescent illumination, daytime illumination, LED illumination, and fluorescent illumination, respectively.

18. A method of controlling an image acquisition apparatus, the method comprising:

acquiring images of at least four channels based on a second wavelength band of 10 nm to 1,000 nm;

estimating illumination information of the images by inputting the images of at least four channels to a deep learning network trained in advance; and converting colors of the acquired images by using the estimated illumination information, wherein the estimated illumination information comprises local illumination information estimated by dividing the images in units of patches, and selectively inputting at least one patch among the patches to the deep learning network, and wherein the at least one patch is selectively input to the deep learning network based on an object included in the at least one patch and a color histogram of the at least one patch.

* * * * *